US008665285B2

(12) United States Patent
Yamada et al.

(10) Patent No.: US 8,665,285 B2
(45) Date of Patent: Mar. 4, 2014

(54) STORAGE MEDIUM HAVING STORED THEREIN IMAGE PROCESSING PROGRAM, IMAGE PROCESSING APPARATUS, IMAGE PROCESSING SYSTEM, AND IMAGE PROCESSING METHOD

(75) Inventors: Yoichi Yamada, Kyoto (JP); Hiromu Takemura, Kyoto (JP); Ryo Tanaka, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 641 days.

(21) Appl. No.: 12/938,668

(22) Filed: Nov. 3, 2010

(65) Prior Publication Data

US 2011/0304620 A1 Dec. 15, 2011

(30) Foreign Application Priority Data

Jun. 9, 2010 (JP) ................................. 2010-132400

(51) Int. Cl.
| | |
|---|---|
| G06T 15/00 | (2011.01) |
| G09G 5/00 | (2006.01) |
| G06T 11/40 | (2006.01) |
| G06T 1/60 | (2006.01) |
| G06K 9/00 | (2006.01) |
| G06K 9/26 | (2006.01) |
| G06K 9/60 | (2006.01) |
| A63F 9/24 | (2006.01) |
| G06F 3/048 | (2013.01) |

(52) U.S. Cl.
USPC ........... 345/582; 345/419; 345/653; 345/530; 345/552; 382/154; 382/285; 382/305; 463/1; 463/32; 463/43; 715/757; 715/848

(58) Field of Classification Search
USPC ........... 345/418–419, 427, 619, 63, 653, 660, 345/501, 530, 538, 545, 548, 552, 960; 382/154, 285, 305, 307; 463/1, 5, 463/30–32, 43; 715/751, 757, 764, 715/848–851
See application file for complete search history.

(56) References Cited

U.S. PATENT DOCUMENTS

| | | | |
|---|---|---|---|
| 2004/0063501 A1* | 4/2004 | Shimokawa et al. ........... | 463/49 |
| 2004/0095353 A1* | 5/2004 | Ueda et al. ..................... | 345/473 |
| 2005/0046625 A1* | 3/2005 | Kawamoto ..................... | 345/419 |
| 2010/0060575 A1* | 3/2010 | Ohta ............................. | 345/158 |
| 2011/0148901 A1* | 6/2011 | Adams et al. ................. | 345/589 |

FOREIGN PATENT DOCUMENTS

JP        2003-325973        11/2003

* cited by examiner

*Primary Examiner* — Wesner Sajous
(74) *Attorney, Agent, or Firm* — Nixon & Vanderhye, P.C.

(57) ABSTRACT

A plurality of polygons are placed in a 3-dimensional virtual space. Each of plural types of first textures corresponding to plural types of attributes which the plurality of polygons have is mapped to the polygon that has the attribute of the type corresponding to the first texture, the 3-dimensional virtual space is shot by a first virtual camera, and thereby a main image is generated. In addition, each of the plural types of second textures corresponding to plural types of attributes which the plurality of polygons have is mapped to the polygon that has the attribute of the type corresponding to the second texture, the 3-dimensional virtual space is shot by a second virtual camera, and thereby a main image is generated.

23 Claims, 18 Drawing Sheets

F I G. 10
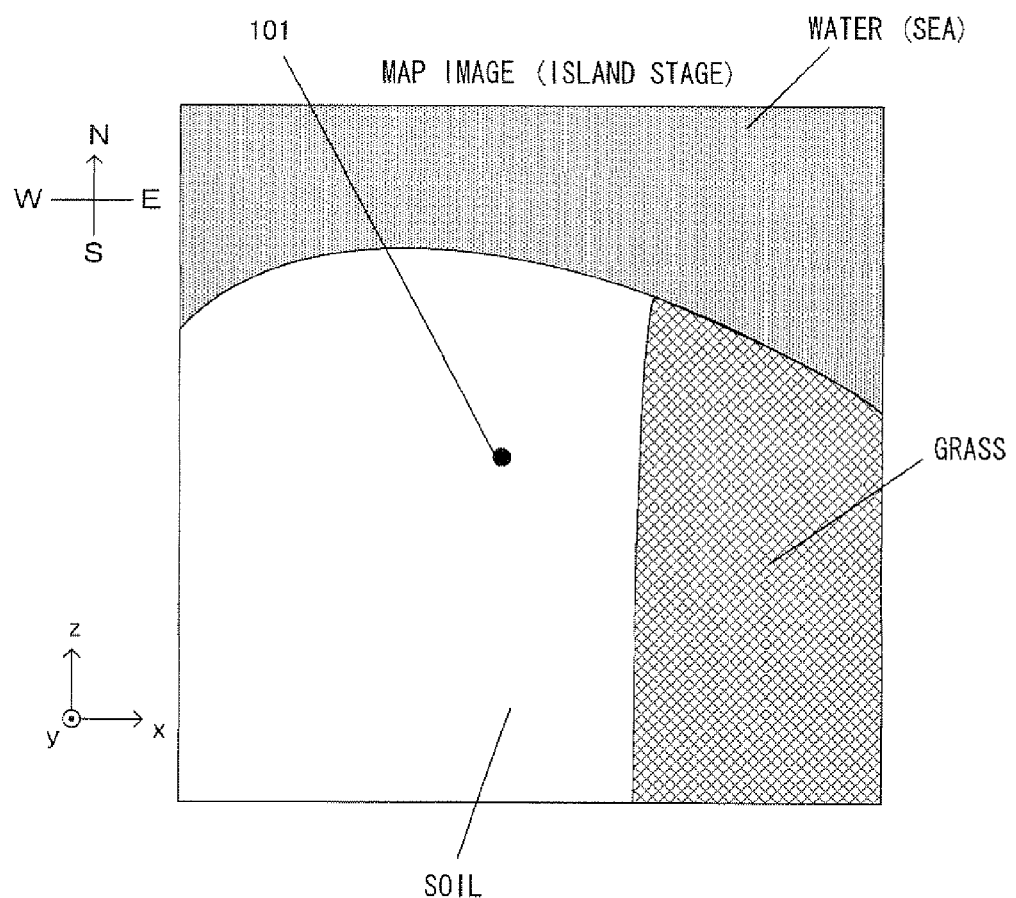

STORAGE MEDIUM HAVING STORED THEREIN IMAGE PROCESSING PROGRAM, IMAGE PROCESSING APPARATUS, IMAGE PROCESSING SYSTEM, AND IMAGE PROCESSING METHOD

CROSS REFERENCE TO RELATED APPLICATION

The disclosure of Japanese Patent Application No. 2010-132400, filed on Jun. 9, 2010, is incorporated herein by reference.

BACKGROUND

1. Field

Example embodiments of the present invention may relate to a storage medium having stored therein a game processing program for generating an image obtained by shooting a 3-dimensional virtual space by a virtual camera, and a map image obtained by shooting the 3-dimensional virtual space, for example, from above, and relates to an image processing apparatus, an image processing system, and an image processing method for generating the same.

2. Description of the Background Art

Conventionally, there is known a technique of shooting a 3-dimensional virtual space by a virtual camera to display the resultant image, and along with this, displaying a map of the 3-dimensional virtual space. For example, a game system disclosed in Japanese Laid-Open Patent Publication No. 2003-325973 displays a 3-dimensional game screen of a game space which is a 3-dimensional virtual space as viewed from a given viewpoint, and a 2-dimensional map which is a planar view of the game space as viewed from above.

However, the game system disclosed in Japanese Laid-Open Patent Publication No. 2003-325973 separately stores data for configuring the 3-dimensional virtual space and data for configuring the 2-dimensional map. Therefore, the sizes of a necessary storage medium (optical disc, ROM, etc.) and a memory (RAM etc.) for temporarily storing data for depicting an image increase. In addition, if a plurality of 3-dimensional virtual spaces (game stages) are present, data of 2-dimensional maps corresponding to the respective 3-dimensional virtual spaces must be prepared. Therefore, also in this respect, the sizes of a necessary storage medium and a necessary memory increase.

SUMMARY

Therefore, example embodiments of the present invention may provide a storage medium and the like, the storage medium having stored therein an image processing program capable of generating a 3-dimensional image (main image) representing a 3-dimensional virtual space, and a map image of the 3-dimensional virtual space while saving the storage spaces of a storage medium (optical disc, ROM, etc.) to be used and a memory (RAM etc.) for temporarily storing data for depicting an image.

Example embodiments of the present invention may include the following features to solve the above problems.

Example embodiments of the present invention may include a computer-readable storage medium having stored therein an image processing program which is executed by a computer of an image processing apparatus which places a plurality of polygons in a 3-dimensional virtual space, the image processing apparatus including storage means for storing plural types of attributes which the plurality of polygons have, plural types of first textures corresponding to the plural types of attributes, and plural types of second textures corresponding to the plural types of attributes. The image processing causes the computer to function as main image generation means and map image generation means. The main image generation means maps each of the plural types of first textures to the polygon that has the attribute of the type corresponding to the first texture, shoots the 3-dimensional virtual space, by a first virtual camera, and thereby generates a main image. The map image generation means maps each of the plural types of second textures to the polygon that has the attribute of the type corresponding to the second texture, shoots the 3-dimensional virtual space, by a second virtual camera, and thereby generates a main image.

Thus, since the map image generation means maps the second textures to the polygon that has the attribute of the type corresponding to the second texture, and thereby generates the map image, it is not necessary to separately prepare data of the map image corresponding to the main image as in the conventional technique. As a result, the storage spaces of a storage medium and a memory (optical disc, ROM, RAM, etc.) can be saved.

In addition, the plural types of attributes stored in the storage means may include plural types of first attributes for the main image, and plural types of second attributes for the map image; each of the plural types of first textures may correspond to one of the plural types of first attributes; each of the plural types of second textures may correspond to one of the plural types of second attributes; the main image generation means may map each of the plural types of first textures to the polygon that has the first attribute of the type corresponding to the first texture, shoot the 3-dimensional virtual space by the first virtual camera, and thereby generate the main image; and the map image generation means may map each of the plural types of second textures to the polygon that has the second attribute of the type corresponding to the second texture, shoot the 3-dimensional virtual space by the second virtual camera, and thereby generate the map image.

Thus, the first attribute and the second attribute of one polygon can be different from each other. As a result, a map image, a part of or the entirety of, which does not correspond to the main image can be generated. For example, in the case where the main image is a game image, the map image can represent a past map (terrain) corresponding to the present game image.

In addition, the image processing program may further cause the computer to function as: placement determination means for determining, for at least the polygon that is to be placed in a shooting area of the second virtual camera, whether or not the second attribute of the polygon is of a type that causes the polygon to be placed; and polygon placement means for placing the plurality of polygons in the 3-dimensional virtual space. The polygon placement means may place, in the 3-dimensional virtual space, at least all the polygons that are to be placed in a shooting area of the first virtual camera, when the main image generation means generates the main image, and may place, in the 3-dimensional virtual space, only a polygon having the second attribute of the type that causes the polygon to be placed, among at least the polygons that are to be placed in the shooting area of the second virtual camera, when the map image generation means generates the map image.

Thus, since a map image in which things unnecessary to be represented as a map are omitted can be generated, the map image is easy to view as a map.

In addition, the image processing program may further cause the computer to function as: polygon placement means for placing the plurality of polygons in the 3-dimensional virtual space; and mapping determination means for determining, for at least the polygon placed in a shooting area of the second virtual camera, whether or not the second attribute of the polygon is of a type that causes one of the plural types of second textures to be mapped to the polygon. The map image generation means may map, only to the polygon that has the second attribute that has been determined by the mapping determination means to be of the type that causes one of the plural types of second textures to be mapped to the polygon, the second texture of the type corresponding to the second attribute.

Thus, since a map image in which things unnecessary to be represented as a map are omitted can be generated, the map image is easy to view as a map.

In addition, the 3-dimensional virtual space shot by the main image generation means may be identical to the 3-dimensional virtual space shot by the map image generation means.

Thus, since the main image and the map image can be generated from one 3-dimensional virtual space, the storage spaces of a storage medium and a memory (optical disc, ROM, RAM, etc.) can be saved. In addition, at a stage of manufacturing programs, when shapes formed by a plurality of polygons in the 3-dimensional virtual space are changed, a map image to be generated is also changed along with the change of the shapes, and therefore, a load on manufacturers of programs is reduced.

In addition, the first virtual camera may shoot in any direction, and the second virtual camera may shoot in a fixed direction.

Thus, the map image is an image viewed from a fixed direction. As a result, the viewpoint of the map image is fixed, positions can be easily understood, and the map image is easy to view as a map.

In addition, the second virtual camera may shoot by parallel projection.

As a result, the map image is easy to view as a map.

In addition, an image size of the second texture may be smaller than an image size of the first texture.

Thus, since the size of data of the second textures can be reduced, the storage spaces of a storage medium and a memory (optical disc, ROM, RAM, etc.) can be saved.

In addition, the map image generation means may perform mapping to the polygons that have the same type of attribute, in a lump.

Thus, the speed of processing of mapping to polygons increases.

In addition, the map image generation means may map, to each of the plurality of polygons, a plurality of the second textures of the type corresponding to the polygon, such that the plurality of second textures are arranged on the polygon.

Thus, even in the case where the image size of the second texture is significantly smaller than the size of a polygon to which the second texture is to be applied, the second texture can be applied to the polygon efficiently.

In addition, the map image generation means may screen-capture, as a raster graphic image, an image shot by the second virtual camera, and thereby generates the map image.

Thus, since the raster graphic image generated by screen-capturing is displayed as the map image, it is not necessary to perform complex calculation processing such as rendering processing every time the map image is displayed. As a result, a load of processing for displaying a map image is reduced.

In addition, the storage means may store a first object and a second object that represent the same character, the main image generation means may shoot the 3-dimensional virtual space in which the first object is placed, and the map image generation means may shoot the 3-dimensional virtual space in which the second object is placed.

Thus, it is possible to set a display state of a character on the main image and a display state of the corresponding character on the map image to be different from each other.

In addition, the image processing program may further cause the computer to function as: vertical direction position determination means for determining, for at least the polygon that is to be placed in a shooting area of the second virtual camera, whether or not a value indicating the position in the vertical direction of the polygon is larger than a predetermined value; and polygon placement means for placing the plurality of polygons in the 3-dimensional virtual space. The polygon placement means may place, in the 3-dimensional virtual space, at least all the polygons that are to be placed in a shooting area of the first virtual camera, when the main image generation means generates the main image, and may place, in the 3-dimensional virtual space, only a polygon, a value indicating the position in the vertical direction of which has been determined to be not larger than the predetermined value by the vertical direction position determination means, among at least the polygons that are to be placed in the shooting area of the second virtual camera, when the map image generation means generates the map image.

Thus, since a polygon whose position in the vertical direction is high (polygon at a high position in the game space, e.g., a polygon forming a tree) is not placed, a portion that will be hidden by such a polygon (for example, a road under the tree) can be displayed on the map image.

In addition, the first virtual camera may be identical to the second virtual camera.

In the above, the case where example embodiments of the present invention are configured as a computer-readable storage medium having stored therein an image processing program, is described. However, example embodiments of the present invention may be configured as an image processing apparatus, an image processing system, and an image processing method.

Example embodiments of the present invention can provide a storage medium and the like, the storage medium having stored therein an image processing program capable of generating a 3-dimensional image (main image) representing a 3-dimensional virtual space, and a map image of the 3-dimensional virtual space while saving the storage spaces of a storage medium (optical disc, ROM, etc.) to be used and a memory (RAM etc.) for temporarily storing data for depicting an image.

These and other features, aspects and advantages of example embodiments of the present invention will become more apparent from the following detailed description of example embodiments of the present invention when taken in conjunction with the accompanying drawings.

BRIEF DESCRIPTION OF THE DRAWINGS

FIG. 10 shows an example of a map image of the game assumed in the present embodiment;

DESCRIPTION OF THE EXAMPLE EMBODIMENTS

The following will describe an embodiment of the present invention with reference to the drawings. It is noted that the present invention is not limited by the embodiment.

(Whole Configuration of Game System)

Figure 1:
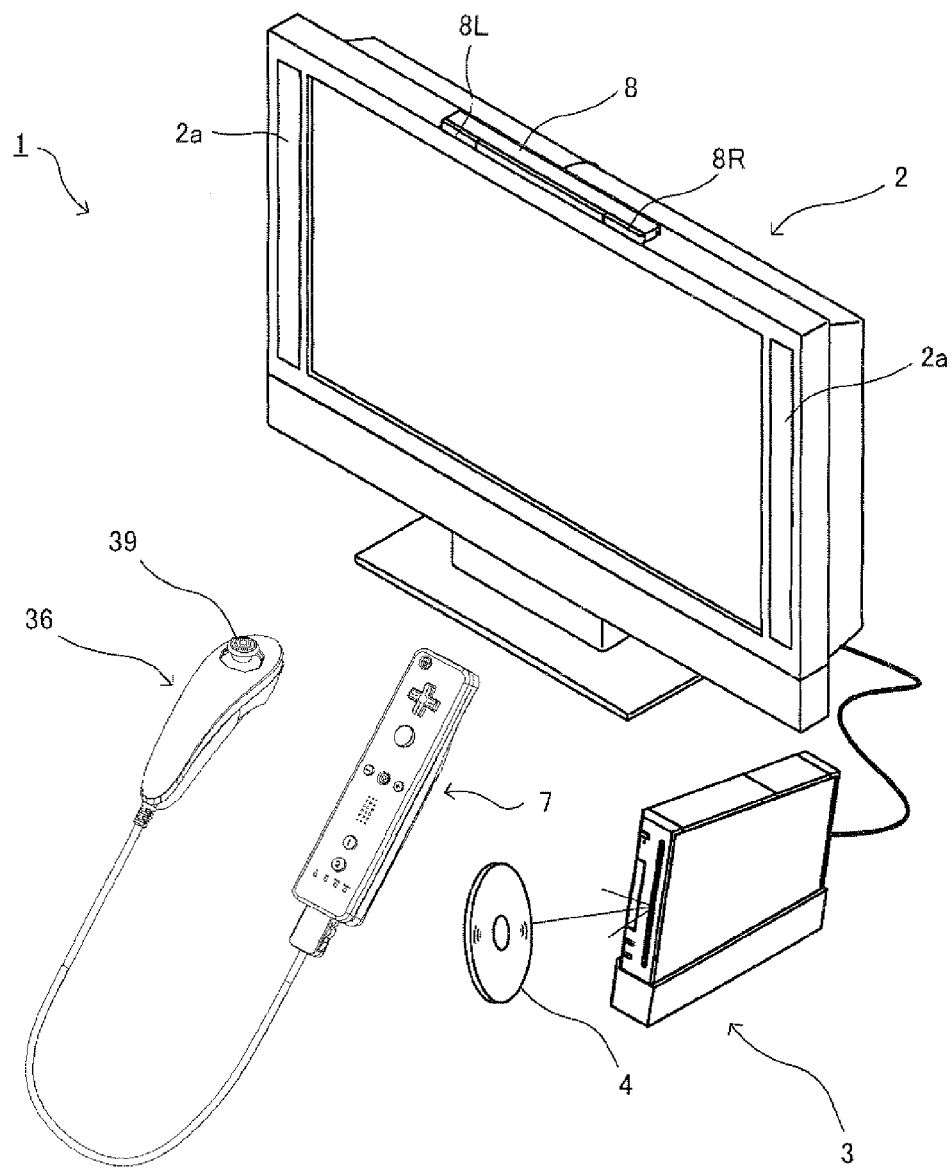
FIG. 1 is an external view of a game system 1 including a game apparatus 3 according to one embodiment of the present invention.

First, with reference to FIG. 1, the following will describe a whole configuration of a game system 1 including a game apparatus according to the embodiment of the present invention. FIG. 1 is an external view of the game system 1. Hereinafter, the game system 1 using a stationary game apparatus will be used as an example, and the game apparatus and a game program according to the present embodiment will be described. As shown in FIG. 1, the game system 1 includes a television receiver (hereinafter, referred to merely as a television) 2, a game apparatus 3, an optical disc 4, a controller 7, an extended controller 36, and a marker section 8. The game system 1 executes game processing at the game apparatus 3 in accordance with a game operation using the controller 7 and the extended controller 36.

The optical disc 4 as an example of an exchangeable information storage medium replaceably used with respect to the game apparatus 3 is detachably inserted in the game apparatus 3. The optical disc 4 stores a game program which is to be executed by the game apparatus 3. The game apparatus 3 has an insertion slot at its front surface. The game apparatus 3 reads and executes the game program stored in the optical disc 4 which is inserted in the insertion slot for executing the game processing.

The television 2 as an example of a display device is connected to the game apparatus 3 via a connection cord. The television 2 displays game images which are obtained as the result of the game processing executed by the game apparatus 3. The marker section 8 is mounted adjacent to the screen of the television 2 (on the upper surface of the screen in FIG. 1). The marker section 8 has a marker 8R and a marker 8L at its opposite ends, respectively. The marker 8R has one or more infrared LEDs which output infrared lights forward from the television 2. The marker 8L has the same configuration as the marker 8R. The marker section 8 is connected to the game apparatus 3, and the game apparatus 3 is capable of controlling illumination of each infrared LED of the marker section 8.

The controller 7 is an input device which provides the game apparatus 3 with operation data which indicates contents of operations made to the controller 7 and the extended controller 36 described later. The controller 7 is connected to the game apparatus 3 by wireless communication. In the present embodiment, the technology of, for example, Bluetooth (registered trademark) is used for the wireless communication between the controller 7 and the game apparatus 3. It is noted that in an alternative embodiment, the controller 7 may be connected to the game apparatus 3 via a wire.

The extended controller 36 is an input apparatus that gives a content of an operation performed for the extended controller 36 to the controller 7, and is connected to the controller 7 via a connection cable. In addition, the extended controller 36 has an analog stick 39 enabling an input in an analog form.

(Internal Configuration of Game Apparatus 3)

Figure 2:
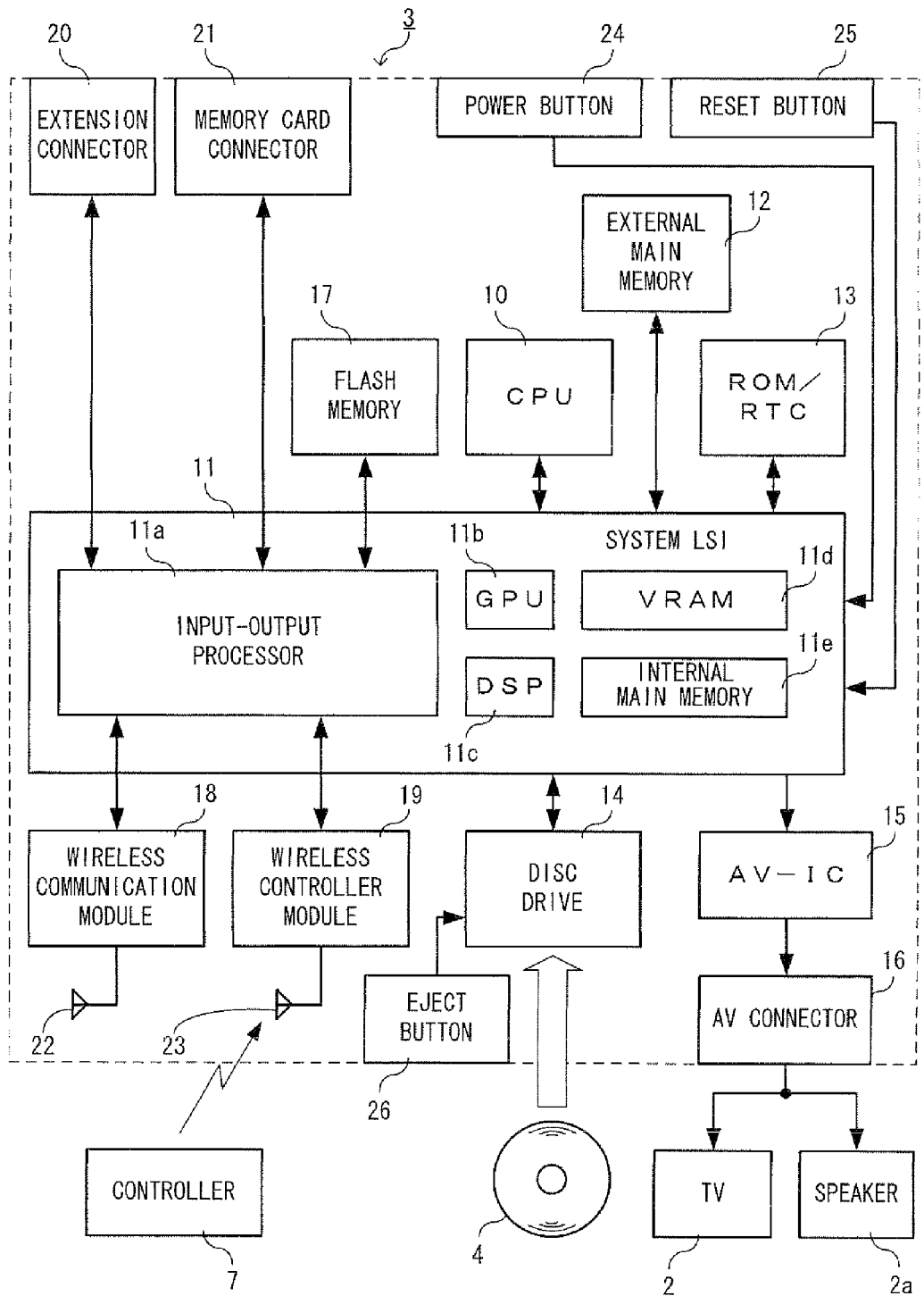
FIG. 2 is a block diagram of an internal configuration of the game apparatus 3.

The following will describe an internal configuration of the game apparatus 3 with reference to FIG. 2. FIG. 2 is a block diagram showing an internal configuration of the game apparatus 3. The game apparatus 3 includes a CPU 10, a system LSI 11, an external main memory 12, a ROM/RTC 13, a disc drive 14, an AV-IC 15, and the like.

The CPU 10 executes the game processing by executing the game program stored in the optical disc 4, and functions as a game processor. The CPU 10 is connected to the system LSI 11. In addition, the external main memory 12, the ROM/RTC 13, the disc drive 14, and the AV-IC 15 are connected to the system LSI 11. The system LSI 11 performs processing such as control of data transfer between the system LSI 11 and each component connected to the system LSI 11, generation of an image to be displayed, obtaining data from an external device, and the like. An internal configuration of the system LSI 11 will be described later. The volatile external main memory 12 stores a program such as the game program read from the optical disc 4, a game program read from a flash memory 17, and the like, and various data, and is used as a work region and a buffer region for the CPU 10. The ROM/RTC 13 includes a ROM (so-called boot ROM) which stores a program for starting up the game apparatus 3, and a clock circuit (RTC: Real Time Clock) for counting time. The disc drive 14 reads program data and texture data from the optical disc 4, and writes these data into an internal main memory 11$e$, which will be described later, or the external main memory 12.

The system LSI 11 is provided with an input-output processor 11$a$, a GPU (Graphics Processor Unit) 11$b$, a DSP (Digital Signal Processor) 11$c$, a VRAM lid, and the internal main memory 11$e$. Although not shown in the drawings, these components 11$a$ to 11$e$ are connected to each other via an internal bus.

The GPU 11$b$ forms a part of drawing means, and generates an image according to a graphics command (command for generating graphics) from the CPU 10. More specifically, the GPU 11$b$ performs computing processing required for displaying 3D graphics, for example, performs processing of coordinate conversion from 3D coordinates into 2D coordinates which is performed prior to rendering, and processing of rendering such as attaching texture, thereby generating a game image and a map image. It is noted that although being described later, data of the map image is converted (screen-captured) to paint data by the GPU 11b. Here, in addition to the graphics command, the CPU 10 provides the GPU 11b with an image generation program required for generating the game image data and the like. It is noted that in the description below, data such as polygon data and texture data, which are required for the GPU 11b to execute the graphics command, is stored in the external main memory 12, but the data may be stored in the VRAM 11d. In generating an image, the GPU lid creates the image data using the data stored in the external main memory 12.

The DSP lie functions as an audio processor, and generates audio data using sound data and sound waveform (tone color) data which are stored in the internal main memory 11e and the external main memory 12. Like the external main memory 12, the internal main memory 11e stores a program and various data, and is used as a work region and a buffer region for the CPU 10.

The image data and the sound data generated thus are read by the AV-IC 15. The AV-IC 15 outputs the image data to the television 2 via an AV connector 16, and the sound data to speakers 2a built in the television 2. Thus, an image is displayed on the television 2, and sound is outputted from the speakers 2a.

The input-output processor (I/O process) 11a performs transmission and reception of data to and from each component connected to the input-output processor 11a, and downloads data from an external device. The input-output processor 11a is connected to the flash memory 17, a wireless communication module 18, a wireless controller module 19, an extended connector 20, and a memory card connector 21. An antenna 22 is connected to the wireless communication module 18, and an antenna 23 to the wireless controller module 19.

The input-output processor 11a is connected to a network via the wireless communication module 18 and the antenna 22, so that the input-output processor 11a is communicable with another game apparatus connected to the network and various servers connected to the network. The input-output processor 11a periodically accesses the flash memory 17 to detect whether there are data required to be transmitted to the network. If there are such data, the input-output processor 11a transmits the data to the network via the wireless communication module 18 and the antenna 22. The input-output processor 11a receives data transmitted from the other game apparatus and data downloaded from a download server via the network, the antenna 22 and the wireless communication module 18, and stores the received data in the flash memory 17. The CPU 10 reads the data stored in the flash memory 17 by executing the game program, and uses the data in the game program. In addition to the data transmitted or received between the game apparatus 3 and the other game apparatus and various servers, the flash memory 17 may store saved data (result data or midstream data of the game) of the game played using the game apparatus 3.

The input-output processor 11a receives operation data transmitted from the controller 7 via the antenna 23 and the wireless controller module 19, and stores (temporarily stores) the operation data in the buffer region of the internal main memory 11e or the external main memory 12.

In addition, the extended connector 20 and the memory card connector 21 are connected to the input-output processor 11a. The extended connector 20 is a connector for an interface such as USB and SCSI, and the communication with the network is enabled by connecting a medium such as an external storage medium, a peripheral device such as the extended controller 36, or a wired connector for communication to the extended connector 20 instead of the wireless communication module 18. The memory card connector 21 is a connector for connecting thereto an external storage medium such as a memory card. For example, the input-output processor 11a accesses the external, storage medium via the extended connector 20 and the memory card connector 21 for storing data in the external storage medium and reading data from the external storage medium.

The game apparatus 3 is provided with a power button 24, a reset button 25, and an eject button 26. The power button 24 and the reset button 25 are connected to the system LSI 11. When the power button 24 is turned on, electric power is supplied to each component of the game apparatus 3 via an AC adaptor (not shown). In the state where the power has been turned on, the power button 24 is pressed to shift to a low power standby mode. Even in the low power standby mode, electric power is supplied to the game apparatus 3. Because electric power is always supplied to the game apparatus 3, the game apparatus 3 can be always connected to a network such as the Internet even in this state. For turning off the power once the power is turned on, the power button 24 is pressed for a predetermined period of time or longer. The reset button 25 is pressed to cause the system LSI 11 to restart a boot program of the game apparatus 3. The eject button 26 is connected to the disc drive 14. The eject button 26 is pressed to eject the optical disc 4 from the disc drive 14.

Figure 3:
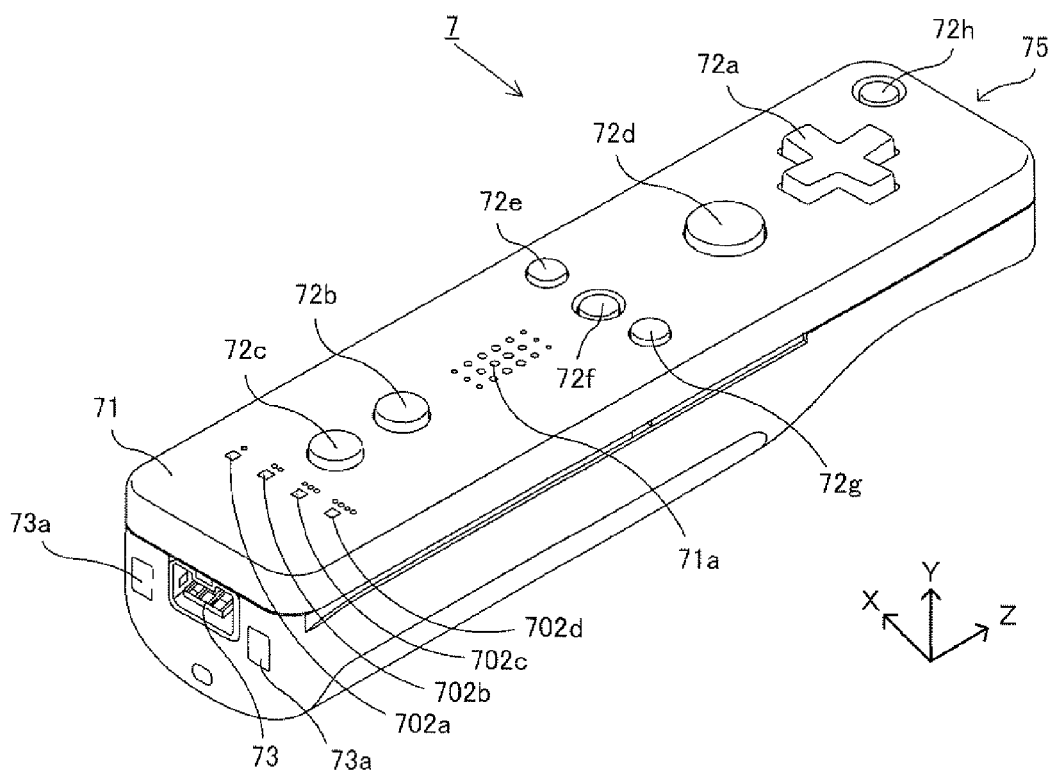
FIG. 3 is a perspective view of a controller 7 seen from a top rear side thereof.
Figure 4:
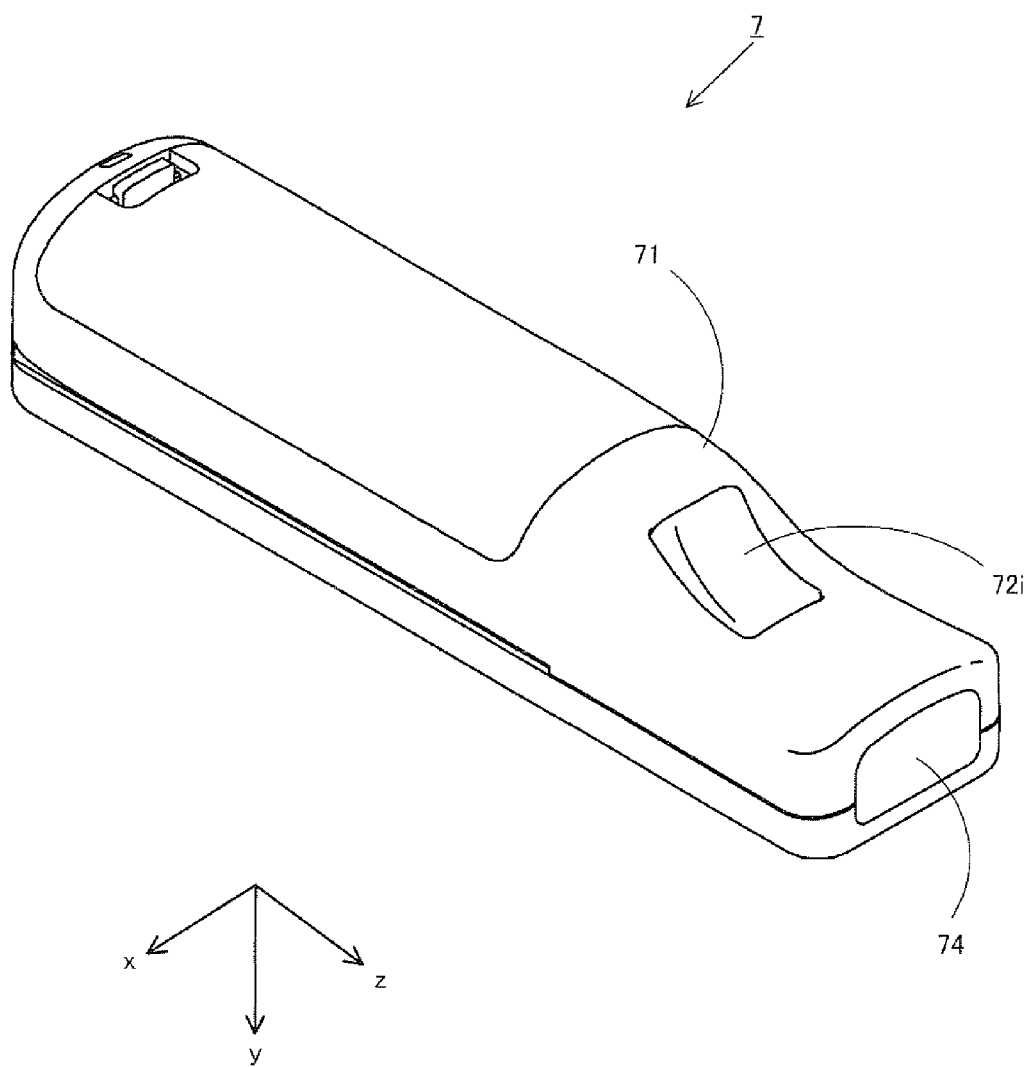
FIG. 4 is a perspective view of the controller 7 seen from a bottom front side thereof.

The following will describe the controller 7 with reference to FIGS. 3 and 4. FIG. 3 is a perspective view of the controller 7 seen from a top rear side thereof, and FIG. 4 is a perspective view of the controller 7 seen from a bottom front side thereof.

As shown in FIGS. 3 and 4, the controller 7 includes a housing 71 and an operation section 72 including a plurality of operation buttons which are provided on surfaces of the housing 71. The housing 71 of the present embodiment has a generally parallelepiped shape extending in a longitudinal direction from front to rear. The overall size of the housing 71 is small enough to be held by one hand of an adult or even a child, and, for example, the housing 71 is formed by plastic molding.

At the center of a front part of a top surface of the housing 71, a cross key 72a is provided. The cross key 72a is a cross-shaped four-direction push switch. The cross key 72a includes operation portions corresponding to four directions (front, rear, right and left), which are respectively located on cross-shaped projecting portions arranged at intervals of 90 degrees. A player selects one of the front, rear, right and left directions by pressing one of the operation portions of the cross key 72a. Through an operation of the cross key 72a, the player can, for example, indicate a direction in which a player object or the like appearing in a virtual game world is to move, or select an option from a plurality of options.

The cross key 72a is an operation section for outputting an operation signal in accordance with the above-described direction input operation performed by the player. Such an operation section may be provided in another form. For example, the cross key 72a may be replaced with an operation section which includes four push switches arranged in a square and which outputs an operation signal in accordance with the push button pressed by the player. In addition to the four push switches of the operation section, a center switch may be provided at the center of the four push switches to form a composite operation section including the four push switches and the center switch. Alternatively, the cross key 72a may be replaced with an operation section which includes an inclinable stick (or joystick) projecting from a top surface of the housing 71 and which outputs an operation signal in accordance with an inclining direction of the stick. Still alternatively, the cross key 72a may be replaced with an operation section which includes a disc-shaped and horizontally slidable member and which outputs an operation signal in accordance with a sliding direction of the disc-shaped member. Still alternatively, the cross key 72a may be replaced with a touch pad.

Behind the cross key 72a on the top surface of the housing 71, a plurality of operation buttons 72b to 72g are provided. The operation buttons 72b to 72g are each an operation section for, when the player presses a head thereof, outputting a corresponding operation signal. For example, functions as a number one button, a number two button and an A button are assigned to the operation buttons 72b to 72d, respectively. Also, functions as a minus button, a home button and a plus button are assigned to the operation buttons 72e to 72g, respectively. Operation functions are assigned to the operation buttons 72b to 72g in accordance with the game program executed by the game apparatus 3. In an exemplary arrangement shown in FIG. 3, the operation buttons 72b to 72d are arranged in a line at the center in a front-rear direction on the top surface of the housing 71. The operation buttons 72e to 72g are arranged on the top surface of the housing 71 in a line in a left-right direction between the operation buttons 72b and 72d. The operation button 72f has a top surface thereof buried in the top surface of the housing 71, so as not to be inadvertently pressed by the player.

In front of the cross key 72a on the top surface of the housing 71, an operation button 72h is provided. The operation button 72h is a power switch for turning on and off the power to the game apparatus 3 by remote control. The operation button 72h also has a top surface thereof buried in the top surface of the housing 71, so as not to be inadvertently pressed by the player.

Behind the operation button 72c on the top surface of the housing 71, a plurality of LEDs 702 are provided. Here, a controller type (number) is assigned to the controller 7 such that the controller 7 is distinguishable from the other controllers 7. The LEDs 702 are used for, for example, informing the player of the controller type which is currently set for the controller 7. More specifically, when the controller 7 transmits transmission data to the game apparatus 3, one of the plurality of LEDs 702 which corresponds to the controller type of the controller 7 is lit up.

On the top surface of the housing 71, a plurality of holes is provided between the operation button 72b and the operation buttons 72e to 72g for emitting sound from a speaker (a speaker 706 in FIG. 5), which will be described later, to the outside therethrough.

On a bottom surface of the housing 71, a recessed portion is formed. As described later in detail, the recessed portion is formed in a position in which an index finger or middle finger of the player is located when the player holds the controller 7 such that the front surface thereof faces the makers 8L and 8R. On a slope surface of the recessed portion, an operation button 72i is provided. The operation button 72i is an operation section functioning as, for example, a B button.

On a front surface of the housing 71, an image pickup element 743 constituting a part of an imaging information calculation section 74 is provided. The imaging information calculation section 74 is a system for analyzing image data of an image taken by the controller 7, thereby identifying an area having a high brightness in the image and detecting a position of a center of gravity, a size and the like of the area. The imaging information calculation section 74 has, for example, a maximum sampling period of about 200 frames/sec, and therefore can trace and analyze even a relatively fast motion of the controller 7. A configuration of the imaging information calculation section 74 will be described later in detail. On a rear surface of the housing 71, a connector 73 is provided. The connector 73 is, for example, an edge connector, and is used for engaging and connecting the controller 7 with a connection cable.

For giving a more specific description, a coordinate system set with respect to the controller 7 will be defined. 3 and 4, mutually perpendicular x-axis, y-axis, and z-axis are defined with respect to the controller 7. More specifically, the longitudinal direction of the housing 71 or the front-rear direction of the controller 7 corresponds to z-axis, and the direction toward the front surface of the controller 7 (the surface in which the imaging information calculation section 74 is provided) is a positive direction of z-axis. The up-down direction of the controller 7 corresponds to y-axis, and the direction toward the top surface of the housing 71 (the surface on which the operation button 72a is provided) is a positive direction of y-axis. As shown in FIGS. The left-right direction of the controller 7 corresponds to x-axis, and the direction toward the right side surface housing 71 (the side surface which is not shown in FIG. 3 but shown in FIG. 4) is a positive direction of x-axis.

Figure 5:
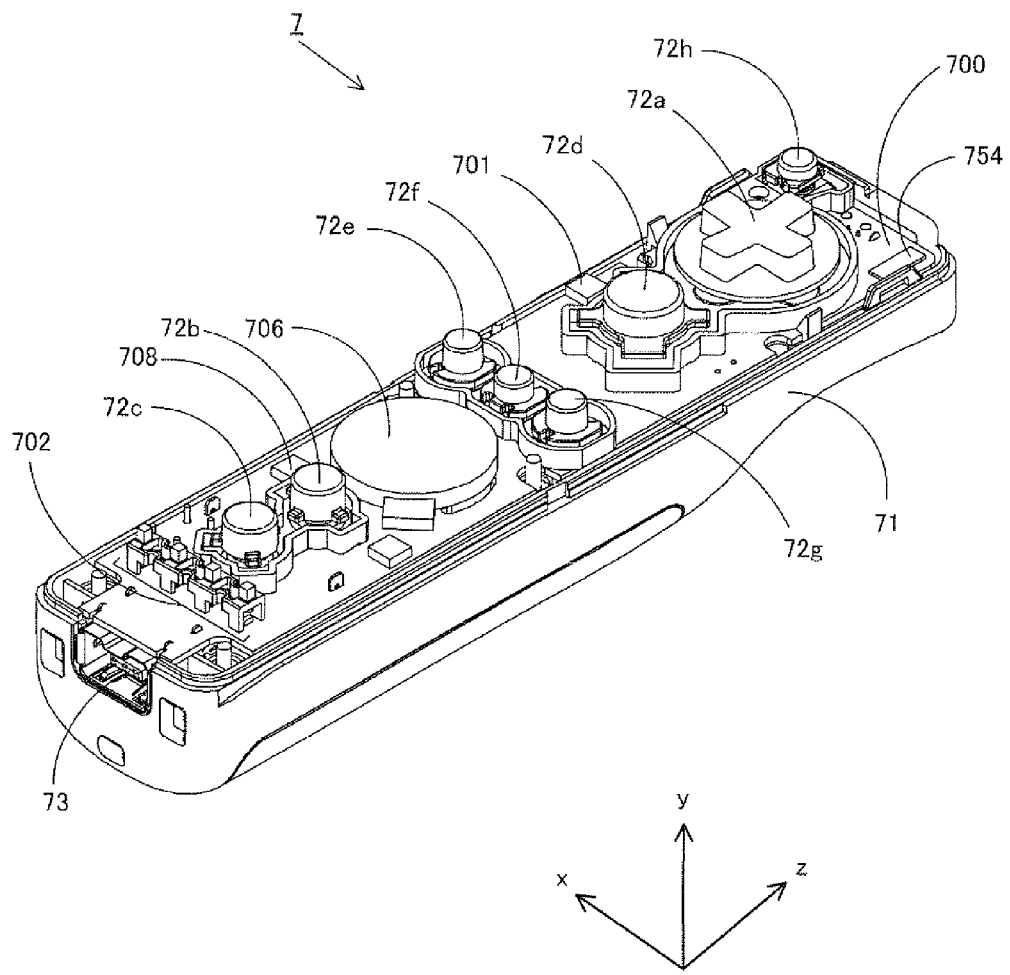
FIG. 5 is a perspective view of the controller 7 as seen from a rear side thereof in a state where an upper housing (a part of a housing 71) thereof is removed.
Figure 6:
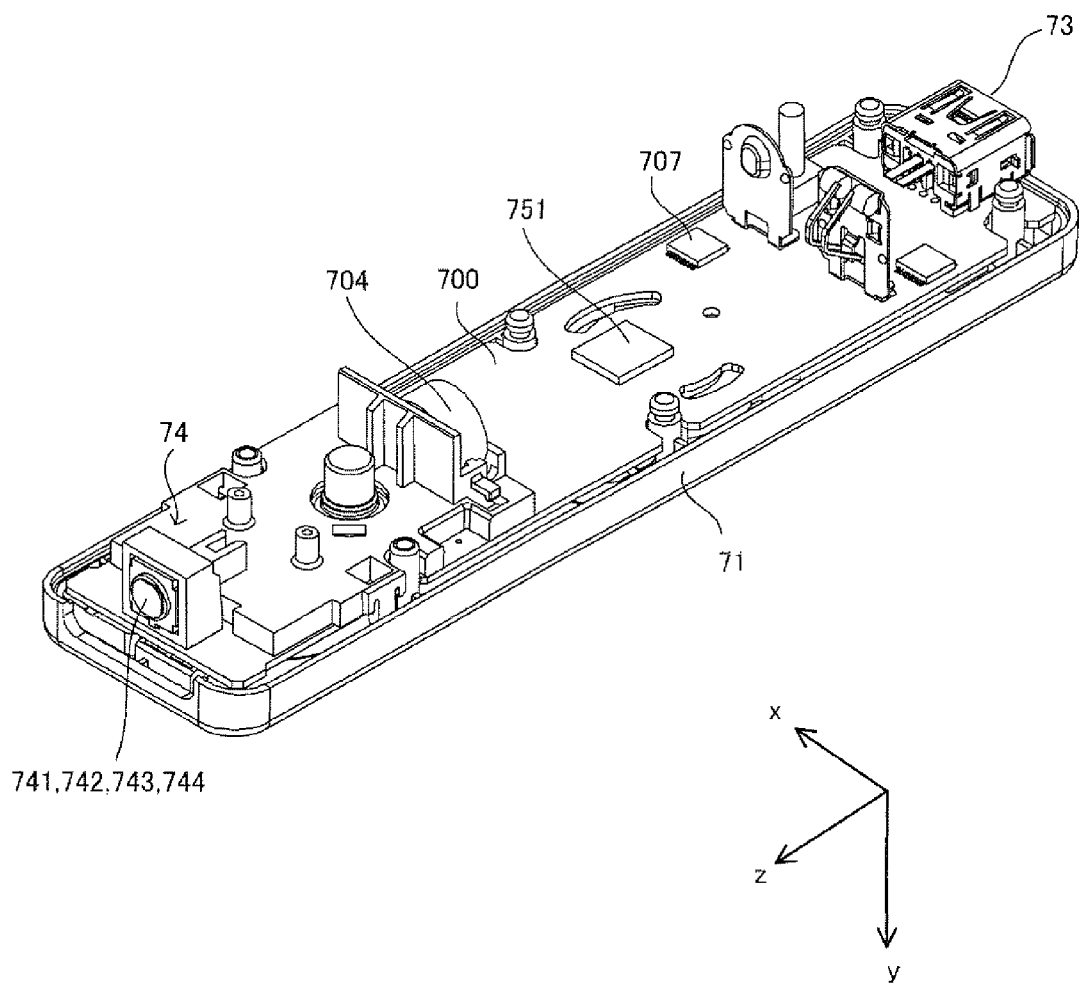
FIG. 6 is a perspective view of the controller 7 as seen from a front side thereof in a state where a lower housing (a part of the housing 71) thereof is removed.

The following will describe an internal structure of the controller 7 with reference to FIGS. 5 and 6. FIG. 5 is a perspective view of the controller 7 as seen from a rear side thereof in a state where an upper housing (a part of a housing 71) thereof is removed. FIG. 6 is a perspective view of the controller 7 as seen from a front side thereof in a state where a lower housing (a part of the housing 71) of the controller 7 is removed. Here, FIG. 6 shows a reverse side of a substrate 700 shown in FIG. 5.

As shown in FIG. 5, the substrate 700 is fixed inside the housing 71. On a top main surface of the substrate 700, the operation buttons 72a to 72h, an acceleration sensor 701, the LEDs 702, and an antenna 754 and the like are provided. These components are connected to a microcomputer 751, and the like (see FIGS. 6 and 7) by lines (not shown) formed on the substrate 700 and the like. The microcomputer 751 functions to generate operation data in accordance with a type of the operation button 72a and the like. This function is a known technique, and achieved, for example, by the microcomputer 751 detecting contact/non-contact of the line by a switch mechanism such as a tact switch located below a keytop. More specifically, the operation button is pressed to contact with the line, thereby conducting a current therethrough. The microcomputer 751 detects which operation button the line, in which the current conduction occurs, leads to, and generates a signal in accordance with a type of the operation button.

The controller 7 functions as a wireless controller by a wireless module 753 (see FIG. 7) and the antenna 754. In the housing 71, a crystal oscillator (not shown) is provided for generating a basic clock of the microcomputer 751, which will be described later. On the top main surface of the substrate 700, the speaker 706 and an amplifier 708 are provided. The acceleration sensor 701 is provided on the left side of the operation button 72d on the substrate 700 (i.e. on the periphery of the substrate 700, not on the center thereof). The acceleration sensor 701 is capable of detecting acceleration included in a component caused by a centrifugal force in accordance with rotation of the controller 7 about the longitudinal direction thereof, in addition to change of direction of gravitational acceleration. Thus, the game apparatus 3 or the like can be sensitive enough to determine the rotation of the controller 7 from detected acceleration data using a predetermined calculation.

As shown in FIG. 6, at a front edge of a bottom main surface of the substrate 700, the imaging information calculation section 74 is provided. The imaging information calculation section 74 includes an infrared filter 741, a lens 742, the image pickup element 743 and an image processing circuit 744 which are located in this order from the front surface of the controller 7. These components are attached to the bottom main surface of the substrate 700. At a rear edge of the bottom main surface of the substrate 700, the connector 73 is attached. On the bottom main surface of the substrate 700, a sound IC 707 and the microcomputer 751 are provided. The sound IC 707 is connected to the microcomputer 751 and the amplifier 708 by lines formed on the substrate 700 and the like, and outputs a sound signal to the speaker 706 via the amplifier 708 in accordance with the sound data transmitted from the game apparatus 3.

On the bottom main surface of the substrate 700, a vibrator 704 is attached. The vibrator 704 is, for example, a vibration motor or a solenoid. The vibrator 704 is connected to the microcomputer 751 by a line formed on the substrate 700 and the like, and actuated or unactuated in accordance with vibration data transmitted from the game apparatus 3. The controller 7 is vibrated by an actuation of the vibrator 704, and the vibration is conveyed to the player holding the controller 7. Thus, a so-called vibration-feedback game is realized. Because the vibrator 704 is located in the front portion of the housing 71, the housing 71 is vibrated substantially, and hence the player holding the controller 7 easily feels the vibration.

Figure 7:
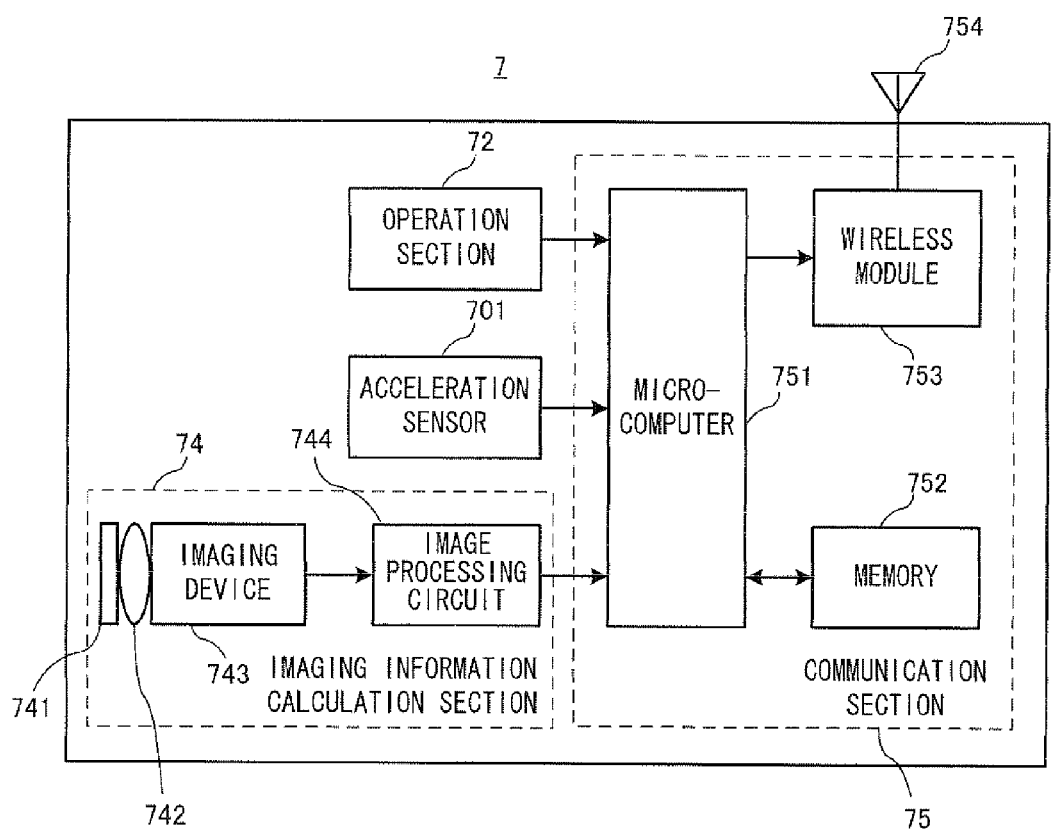
FIG. 7 is a block diagram showing a configuration of the controller 7.

The following will describe an internal constitution of the controller 7 with reference to FIG. 7. FIG. 7 is a block diagram showing an internal configuration of the controller 7.

As shown in FIG. 7, the controller 7 includes therein a communication section 75 in addition to the operation section 72, the imaging information calculation section 74, the acceleration sensor 701, the vibrator 704, the speaker 706, the sound IC 707, and the amplifier 708.

The imaging information calculation section 74 includes the infrared filter 741, the lens 742, the image pickup element 743, and the image processing circuit 744. The infrared filter 741 allows, among lights incident on the front surface of the controller 7, only an infrared light to pass therethrough. The lens 742 converges the infrared light which has passed through the infrared filter 741, and outputs the infrared light to the image pickup element 743. The image pickup element 743 is a solid-state image pickup element such as a CMOS sensor or a CCD. The image pickup element 743 takes an image of the infrared light collected by the lens 742. In other words, the image pickup element 743 takes an image of only the infrared light which has passed through the infrared filter 741. Then, the image pickup element 743 generates image data of the image. The image data generated by the image pickup element 743 is processed by the image processing circuit 744. More specifically, the image processing circuit 744 processes the image data obtained from the image pickup element 743, detects a part of the image which has a high brightness, and outputs, to the communication section 75, process result data indicating the result of calculation of position coordinates and the area of the part. It is noted that the imaging information calculation section 74 is fixed to the housing 71 of the controller 7. An imaging direction of the imaging information calculation section 74 can be changed by changing a facing direction of the housing 71. A signal in response to the position and the motion of the controller 7 can be obtained based on the processing result data outputted from this imaging information calculation section 74.

The controller 7 preferably includes a three-axis (x-axis, y-axis, and z-axis) acceleration sensor 701. The three-axis acceleration sensor 701 detects linear accelerations in three directions, i.e., an up-down direction, a left-right direction, and a front-rear direction. In an alternative embodiment, a two-axis accelerometer which detects only linear acceleration along each of the up-down direction and the left-right direction (the other pair of directions) may be used depending on the type of control signals used in the game processing. As a non-limiting example, the two-axis or three-axis acceleration sensor 701 may be of the type available from Analog Devices, Inc. or ST Microelectronics N.V. In addition, the acceleration sensor 701 may be of electrostatic capacitance or capacitance-coupling type which is based on silicon micromachined MEMS (microelectromechanical systems) technology. However, any other suitable accelerometer technology (e.g., piezoelectric type or piezoresistance type) now existing or later developed may be used to provide the two-axis or three-axis acceleration sensor 701.

As one skilled in the art understands, accelerometers which can be used in the acceleration sensor 701, are only capable of detecting acceleration along a straight line (linear acceleration) corresponding to each axis of the acceleration sensor. In other words, the direct output of the acceleration sensor 701 is limited to signals indicative of linear acceleration (static or dynamic) along each of the one, two or three axes thereof. As a result, the acceleration sensor 701 cannot directly detect movement along a non-linear (e.g. arcuate) path, rotation, rotational movement, angular displacement, inclination, position, attitude or any other physical characteristic.

However, through processing by a computer such as the processor of the game apparatus (e.g. the CPU 10) or the processor of the controller 7 (e.g. the microcomputer 751) based on the linear acceleration signals outputted from the acceleration sensor 701, additional information relating to the controller 7 can be inferred or calculated, as one skilled in the art will readily understand from the description herein. For example, when the processing is performed by the computer on the assumption that the controller 7 provided with the acceleration sensor 701 is in static state (or when the processing is performed while only gravitational acceleration is detected by the acceleration sensor 701), if the controller 7 is actually in static state, the detected acceleration is used to determine whether or not the controller 7 is inclined relative to the direction of gravity or how many degrees the controller 7 is inclined relative to the direction of gravity. More specifically, when a state where the detection axis of the acceleration sensor 701 extends in a vertically-down direction is set as a standard state, it is possible to determine whether or not the controller 7 is inclined by determining whether 1G (gravitational acceleration) is applied in the direction of the detection axis of the acceleration sensor 701. It is also possible to determine how many degrees the controller 7 is inclined with respect to the vertically downward direction by determining the magnitude of the acceleration applied in the above detection axis direction. In addition, in the case of a multi-axis acceleration sensor, it is possible to determine in detail how many degrees each axis is inclined relative to the direction of gravity through processing of a signal of acceleration detected for each axis. In this case, a processor may perform processing based on the output from the acceleration sensor 701 for calculating inclination angle data of the controller 7. Alternatively, processing may be performed so as to infer rough inclination of the controller 7 based on the output from the acceleration sensor 701 without calculating the inclination angle data. As described above, the acceleration sensor 701 is used in combination with the processor to determine inclination, attitude or position of the controller 7. On the other hand, on the assumption that the acceleration sensor 701 is in dynamic state, the acceleration sensor 701 detects acceleration corresponding to motion of the acceleration sensor 701 in addition to a gravitational acceleration component. Thus, it is possible to determine the direction of the motion of the controller 7 by eliminating the gravitational acceleration component through predetermined processing. More specifically, various movements and/or positions of the controller 7 can be calculated or inferred through processing of the acceleration signal generated by the acceleration sensor 701 when the controller 7 provided with the acceleration sensor 701 is subjected to dynamic acceleration by the hand of the player. It is noted that even on the assumption that the acceleration sensor 701 is in dynamic state, it is possible to determine inclination of the controller 7 relative to the direction of gravity by eliminating acceleration corresponding to motion of the acceleration sensor 701 through predetermined processing. In an alternative embodiment, the acceleration sensor 701 may include an embedded signal processor or other type of a dedicated processor for performing any desired processing of the acceleration signals outputted from accelerometers therein prior to outputting signals to the microcomputer 751. For example, the embedded or dedicated processor could convert the detected acceleration signal into a corresponding tilt angle (or another suitable parameter) when the acceleration sensor 701 is intended to detect static acceleration (i.e., gravitational acceleration).

The communication section 75 includes the microcomputer 751, a memory 752, the wireless module 753, and the antenna 754. The microcomputer 751 controls the wireless module 753 for wirelessly transmitting the transmission data while using the memory 752 as a storage area during processing. The microcomputer 751 controls the operations of the sound IC 707 and the vibrator 704 in accordance with the data which the wireless module 753 receives from the game apparatus 3 via the antenna 754. The sound IC 707 processes the sound data and the like transmitted from the game apparatus 3 via the communication section 75. The microcomputer 751 actuates the vibrator 704 in accordance with the vibration data (e.g. a signal for actuating or unactuating the vibrator 704) transmitted from the game apparatus 3 via the communication section 75.

Data from the controller 7 including an operation signal (key data) from the operation section 72, acceleration signals (acceleration data of directions of x-axis, y-axis, and z-axis which is hereinafter referred to merely as acceleration data) from the acceleration sensor 701, and the process result data from the imaging information calculation section 74 are outputted to the microcomputer 751. The microcomputer 751 temporarily stores the input data (the key data, the acceleration data, and the process result data) in the memory 752 as the transmission data which is to be transmitted to the wireless controller module 19. The wireless transmission from the communication section 75 to the wireless controller module 19 is performed periodically at a predetermined time interval. Because game processing is generally performed at a cycle of 1/60 sec., data needs to be collected and transmitted at a cycle of a shorter time period. Specifically, the game processing unit is 16.7 ms (1/60 sec.), and the transmission interval of the communication section 75 structured using the Bluetooth is 5 ms. At the transmission timing to the wireless controller module 19, the microcomputer 751 outputs the transmission data stored in the memory 752 as a series of operation information to the wireless module 753. The wireless module 753 uses, for example, the Bluetooth to modulate the operation data onto a carrier wave of a predetermined frequency and to radiate the resultant radio signal from the antenna 754. Thus, the key data from the operation section 72 provided in the controller 7, the acceleration data from the acceleration sensor 701, and the process result data from the imaging information calculation section 74 are modulated into the radio signal by the wireless module 753 and transmitted from the controller 7. The wireless controller module 19 of the game apparatus 3 receives the radio signal, and the game apparatus 3 demodulates or decodes the radio signal to obtain the series of operation information (the key data, the acceleration data, and the process result data). Based on the obtained operation information and the game program, the CPU 10 of the game apparatus 3 performs the game processing. In the case where the communication section 75 is structured using the Bluetooth, the communication section 75 can have a function of receiving transmission data which is wirelessly transmitted from another device.

[Outlines of Game and Drawing Processing Assumed in the Present Embodiment]

Next, with reference to FIG. 8 to FIG. 10, the outlines of a game and drawing processing assumed in the present embodiment will be described. The game assumed in the present embodiment is a game in which a player object moves in a 3-dimensional virtual space (hereinafter, referred to as a game space).

Figure 8:
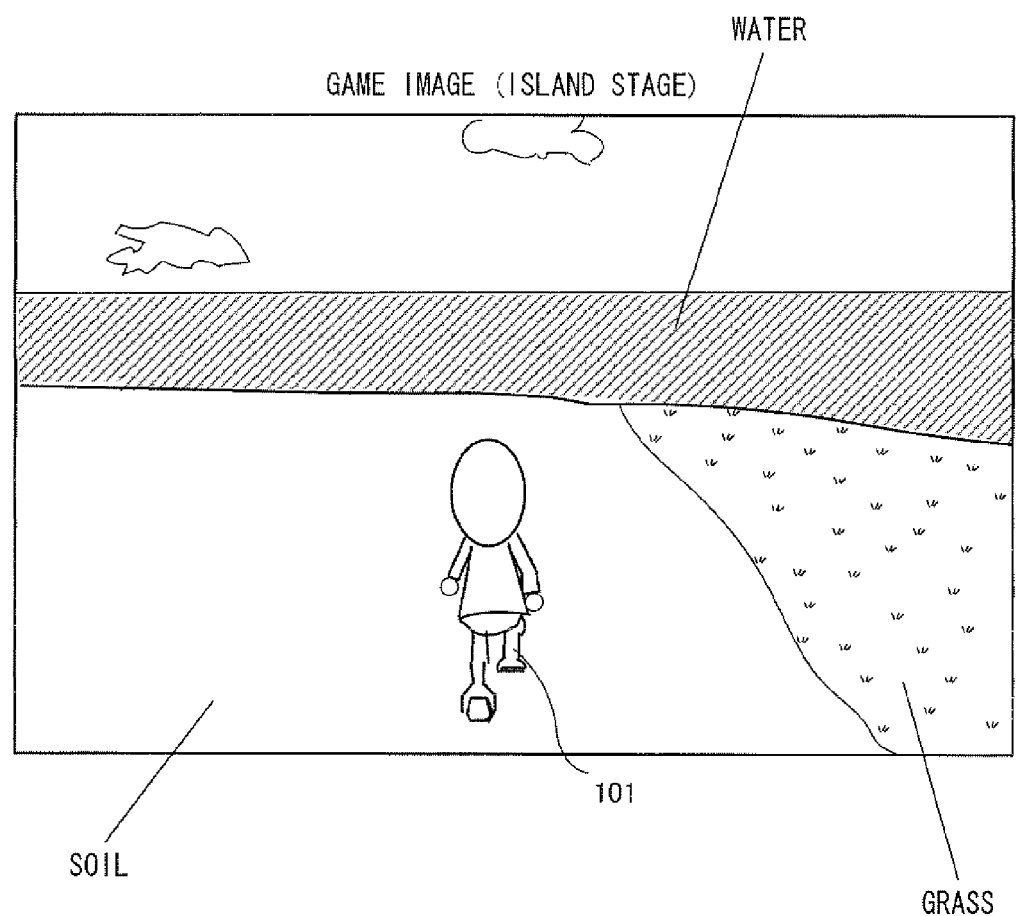
FIG. 8 is a drawing showing an example of a game image of a game assumed in the present embodiment.

FIG. 8 is an example of a game image (main image) of the game assumed in the present embodiment. As shown in FIG. 8, a player object 101 is displayed in a game image. It is noted that other objects (enemy object, weapon object, or the like) can be displayed in the game image though not being displayed in FIG. 8. In the game, as shown in FIG. 8, the game image is shot by a virtual camera (hereinafter, referred to as a game image camera) placed in back of the player object 101 from a so-called third person viewpoint, whereby the game image is depicted. In addition, the game has a plurality of stages including an island stage, a mountain stage, a grassland stage, a town stage, and the like. Then, if a predetermined condition such as a condition that a stage is cleared is satisfied, a stage where the game progresses is switched. It is noted that in FIG. 8, a game image of the island stage is shown.

Figure 9:
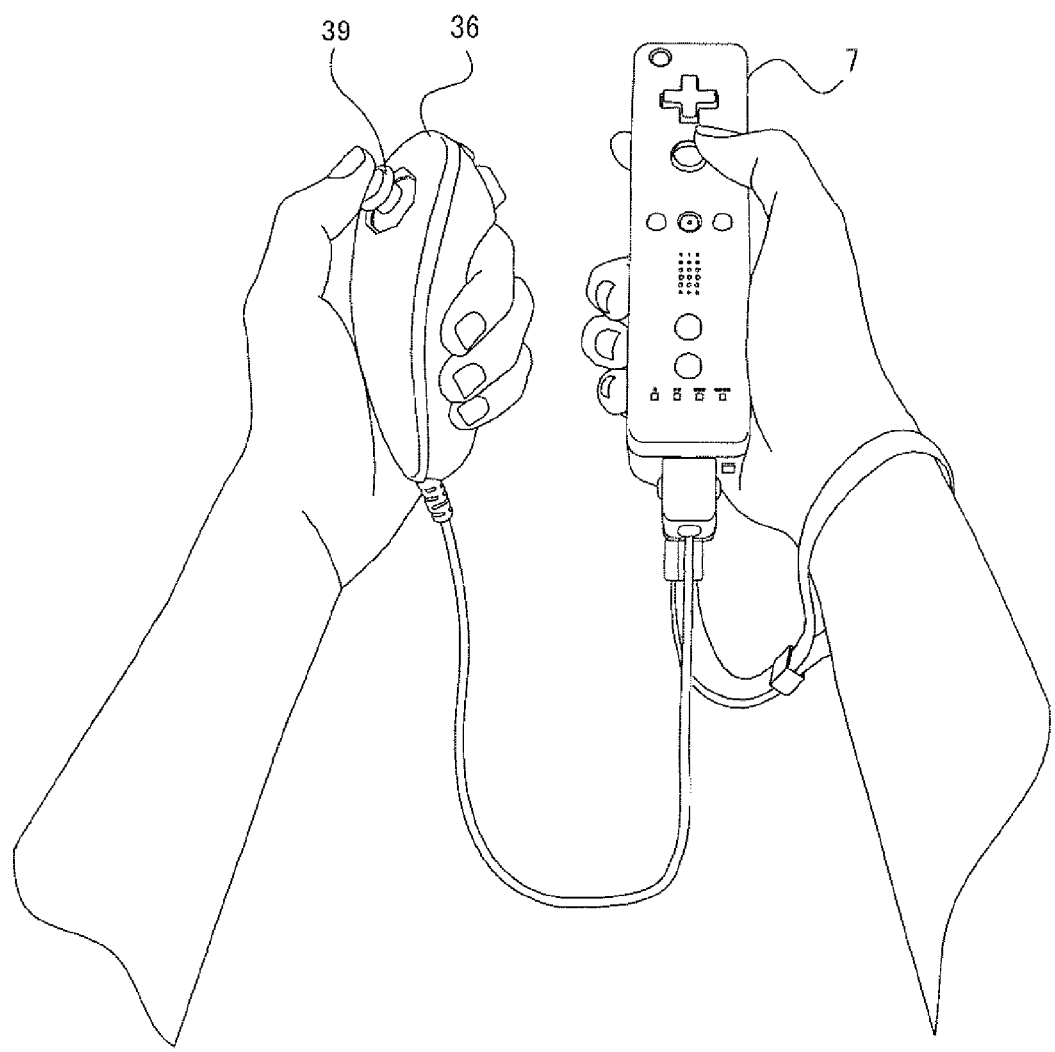
FIG. 9 shows a player operating an extended controller 36 and the controller 7.

The player operates the player object 101 while, for example, holding the extended controller 36 by the left hand and holding the controller 7 by the right hand, the extended controller 36 being connected to the connector 73 of the controller 7, as shown in FIG. 9. Here, the extended controller 36 has the analog stick 39 enabling an input in an analog form. The player can move the player object 101 through operations of giving an input of the up, down, right, or left direction to the analog stick 39.

In addition, when a game image is displayed on the television 2, the player can switch the game image (see FIG. 8) displayed on the television 2 to a map image (see FIG. 10) by pressing the plus button (see 72g in FIG. 3) of the controller 7. As shown in FIG. 10 as an example, the map image is an image representing a map of a game stage currently represented by the game image, and the position of the player object 101 is displayed. In addition, the player can enlarge or reduce (zoom in or out) the displayed map image by pressing the right or left operation portion of the cross key (see 72a in FIG. 3) of the controller 7. For example, if the left operation portion of the cross key (see 72a in FIG. 3) is pressed, the map image is reduced (zoomed out), and if the right operation portion of the cross key (see 72a in FIG. 3) is pressed, the map image is enlarged (zoomed in). In addition, when the map image is displayed on the television 2, the player can switch (return) the map image (see FIG. 10) displayed on the television 2 to the game image (see FIG. 8) by pressing the plus button (see 72g in FIG. 3) of the controller 7.

In the game space, shapes such as terrain, constructions, and characters are formed by multiple polygons. An attribute for a game image (hereinafter, referred to as a game image attribute), and an attribute for a map image (hereinafter, referred to as a map image attribute) are assigned to each of the multiple polygons. Each of the game image attribute and the map image attribute is one of "grass", "water", "soil", "sand", "rock", and the like. In principle, the game image attribute and the map image attribute assigned to one polygon are the same attributes. For example, if the game image attribute assigned to a polygon is "soil", in principle, the map image attribute assigned to the polygon is also "soil". However, there is an exception that the game image attribute and the map image attribute assigned to one polygon are different. For example, the map image attributes include an attribute indicating "nothing". Specifically, even if the game image attribute assigned to a polygon is "soil", the map image attribute assigned to the polygon can be "nothing". As is described later, if the map image attribute of "nothing" is thus assigned to a polygon, the polygon is not drawn on the map image, and thereby the map image can be prevented from being complicated unnecessarily. In addition, for example, even if the game image attribute assigned to a polygon is "soil", the map image attribute assigned to the polygon can be "water". If the map image attribute is thus set to be different from the game image attribute, the map image can represent a map of a sea present in the past in a place that is soil (a land) at the present and was water (a sea) in the past, for example.

Moreover, when a game image is to be depicted, shapes such as terrain, constructions, and characters are formed by multiple polygons in the game space, textures for game images (hereinafter, referred to as game image textures) corresponding to the respective game image attributes assigned to the polygons are applied (mapped) to the respective polygons. For example, if the game image attribute assigned to a polygon is "grass", a texture corresponding to "grass" (that is, a game image texture representing grass) is applied to the polygon. Thus, after game image textures are applied to all polygons present within the shooting area of the game image camera, the game space is shot by the game image camera and thereby a game image is generated.

On the other hand, also when a map image is to be drawn, similarly to the drawing of a game image, shapes such as terrain, constructions, and characters are formed by multiple polygons in the game space. However, at this time, a polygon to which the map image attribute of "nothing" is assigned is not formed in the game space. Thus, an object (for example, a pebble, a fallen leaf, a fallen branch, or a small puddle) that does not need to be displayed in the map image which is used as a map can be excluded from the map image. As a result, an easily viewable map image which is prevented from being complicated unnecessarily and becoming difficult to view, is generated. Thereafter, textures for map images (hereinafter, referred to as map image textures) corresponding to the respective map image attributes assigned to the polygons formed in the game space are applied (mapped) to the respective polygons. For example, if the map image attribute assigned to a polygon is "grass", a texture corresponding to "grass" (that is, a map image texture representing "grass") is applied to the polygon. Thus, after map image textures are applied to all polygons formed in the game space, the entirety of the game space (that is, the present game stage) is shot by a virtual camera for map image (hereinafter, referred to as a map image camera) from above by parallel projection. Thereafter, a shot image is converted (screen-captured) to 2-dimensional image data (paint data). Then, a designated area of an image represented by the 2-dimensional image data is displayed as a map image (see FIG. 10) on the television 2.

Since a map image is drawn by the above processing, in the present embodiment, it is not necessary to separately prepare map images corresponding to respective game stages as in conventional art, and the amounts of usages of storage media such as the optical disc 4, and memories such as a ROM and a RAM can be reduced.

[Detail of Game Process]

Figure 11:
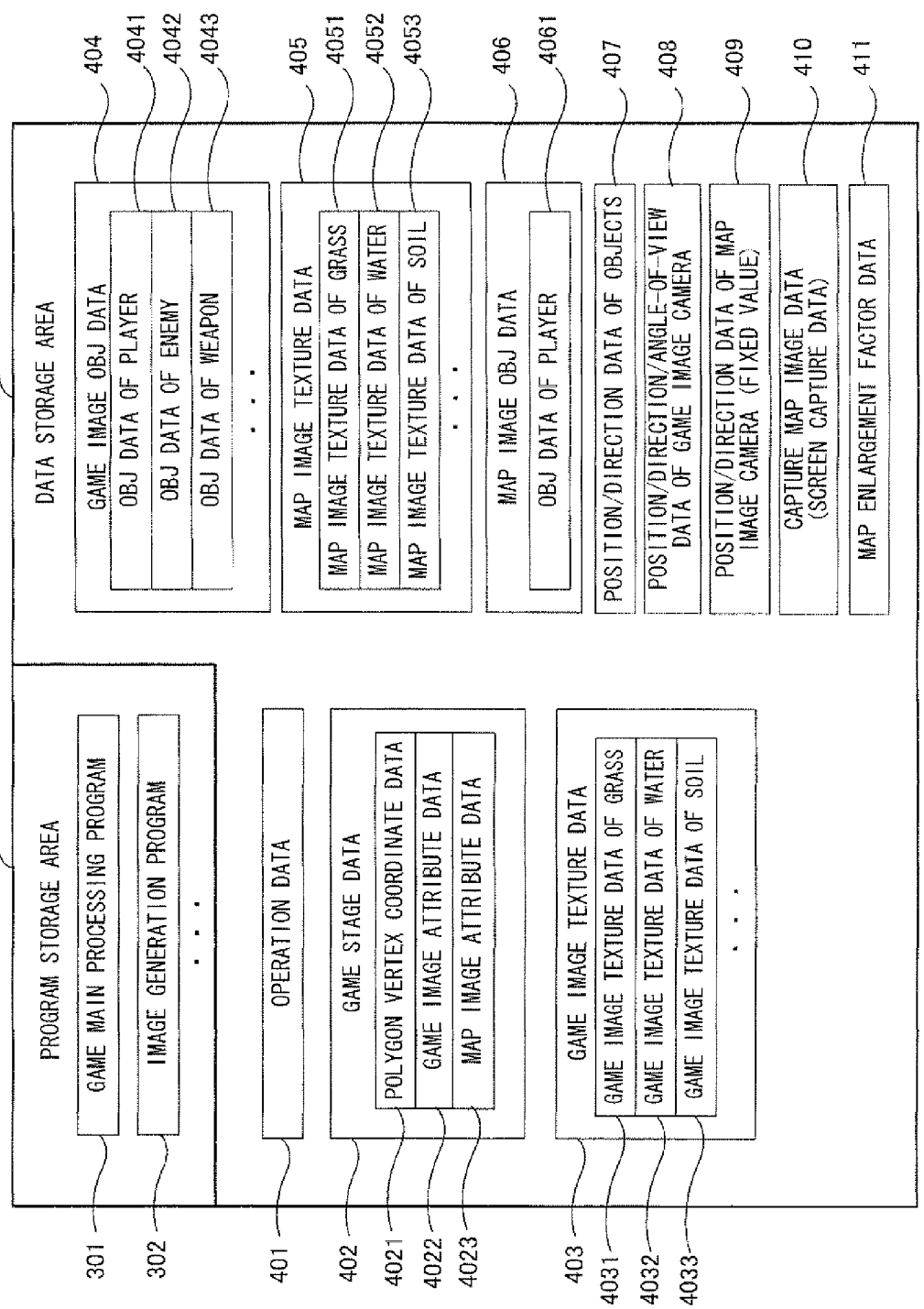
FIG. 11 is a diagram showing a memory map of an external main memory 12 of the game apparatus 3.

Next, the detail of a game process executed by the game apparatus 3 will be described. First, data to be stored in the external main memory 12 when the game process is performed will be described. FIG. 11 is a diagram showing a memory map of the external main memory 12 of the game apparatus 3. As shown in FIG. 11, the external main memory 12 includes a program storage area 300 and a data storage area 400. A part of data in the program storage area 300 and in the data storage area 400 is stored in, for example, the optical disc 4. The part of data is loaded and stored in the external main memory 12 upon execution of the game program.

The program storage area 300 stores a program such as a game main processing program 301 for executing processing of a flowchart shown in FIG. 12 described later, and a program such as an image generation program 302 for executing processing of a flowchart shown in FIG. 13 and FIG. 15 described later.

The data storage area 400 stores operation data 401, game stage data 402, game image texture data 403, game image object (OBJ) data 404, map image texture data 405, map image object (OBJ) data 406, position/direction data 407 of objects (OBJ), position/direction/angle-of-view data 408 of the game image camera, position/direction data 409 of the map image camera, capture map image data 410, map enlargement factor data 411, and the like.

The operation data 401 is obtained from the controller 7, and includes a content of an operation performed by the player. Specifically, the operation data 401 includes a content of an operation performed with the controller 7, and a content of an operation (for example, a content of an operation of the analog stick 39) performed with the extended controller 36.

The game stage data 402 is a piece of data corresponding to a stage on which a game is progressing, which is one of plural pieces of data corresponding to the island stage, the mountain stage, the grassland stage, the town stage, and the like. The piece of data is loaded from the optical disc 4 and stored as the game stage data 402. The game stage data 402 includes polygon vertex coordinate data 4021, game image attribute data 4022, and map image attribute data 4023. The polygon vertex coordinate data 4021 is data indicating the coordinates of vertices of each of polygons forming shapes (terrain etc.) on a stage in the game space. The game image attribute data 4022 is data indicating attributes such as "grass", "water", and "soil" to be assigned to the polygons for generating a game image (see FIG. 8). The map image attribute data 4023 is data indicating attributes such as "nothing", "grass", "water", or "soil" to be assigned to the polygons for generating a map image (see FIG. 10). Here, unlike the game image attribute data 4022, the map image attribute data 4023 includes data indicating the attribute of "nothing". As is described in detail later, polygons to which the attribute of "nothing" is assigned are not placed in the game space when a map image is generated. Therefore, no shape is not drawn on the map image by using these polygons.

The game image texture data 403 includes plural types of texture data for game image that are used when a game image is to be generated. As shown in FIG. 11, the game image texture data 403 includes, as an example, game image texture data 4031 of grass, game image texture data 4032 of water, game image texture data 4033 of soil, and the like. Here, when a game image is to be generated, game image textures corresponding to respective attributes assigned to polygons in the game space by using the game image attribute data 4022 are applied to the respective polygons. Specifically, when a game image is to be generated, a texture representing grass which is indicated by the game image texture data 4031 of grass is applied to a polygon to which the attribute of "grass" is assigned by using the game image attribute data 4022; a texture representing water which is indicated by the game image texture data 4032 of water is applied to a polygon to which the attribute of "water" is assigned by using the game image attribute data 4022; and a texture representing soil which is indicated by the game image texture data 4033 of soil is applied to a polygon to which the attribute of "soil" is assigned by using the game image attribute data 4022.

The game image object (OBJ) data 404 includes data of the player object and the like placed in the game space when a game image is to be generated. Specifically, the game image object data 404 includes object (OBJ) data 4041 of player, object (OBJ) data 4042 of enemy, object (OBJ) data 4043 of weapon, and the like, which are placed in the game space when a game image is to be generated. Such object data includes polygon data, attribute data of polygons, texture data, and the like which are used for forming objects by using polygons in the game space.

The map image texture data 405 includes plural types of texture data for map image that are used when a map image is to be generated. As shown in FIG. 11, the map image texture data 405 includes, as an example, map image texture data 4051 of grass, map image texture data 4052 of water, map image texture data 4053 of soil, and the like. Here, when a map image is to be generated, map image textures corresponding to respective attributes assigned to polygons in the game space by using the map image attribute data 4023 are applied to the respective polygons. Specifically, when a map image is to be generated, a texture representing grass which is indicated by the map image texture data 4051 of grass is applied to a polygon to which the attribute of "grass" is assigned by using the map image attribute data 4023; a texture representing water which is indicated by the map image texture data 4052 of water is applied to a polygon to which the attribute of "water" is assigned by using the map image attribute data 4023; and a texture representing soil which is indicated by the map image texture data 4053 of soil is applied to a polygon to which the attribute of "soil" is assigned by using the map image attribute data 4023. It is noted that if the attribute of "nothing" is assigned to a polygon by using the map image attribute data 4023, the polygon is not formed in the game space when a map image is generated. Accordingly, the map image texture data 405 does not include map image texture data corresponding to the attribute of "nothing".

The map image object (OBJ) data 406 is data of an image representing a player object placed on a map image (hereinafter, referred to as a capture map image) that is formed by paint data generated by screen-capturing a map image (hereinafter, referred to as a rendered map image) generated through imaging processing. Typically, the map image object (OBS) data 406 is image data (4061) of an icon indicating the player object.

The position/direction data 407 of objects is data indicating the positions and the directions (orientations) of objects (including the player object) in the game space.

The position/direction/angle-of-view data 408 of the game image camera is data indicating the position, the direction (shooting direction), and the angle of view (shooting angle of view), in the game space, of the game image camera that shoots the game space when a game image is to be generated. Here, the position, the direction, and the angle of view of the game image camera are changed in accordance with a movement of the player object, or the like.

The position/direction data 409 of the map image camera is data indicating the position and the direction (shooting direction) of the map image camera that shoots the game space from above when a rendered map image is to be generated. The position of the map image camera is a fixed position above in the game space. The direction of the map image camera is a fixed direction in which the map image camera looks vertically down on the game space from the fixed position. It is noted that the map image camera shoots, by parallel projection, the entirety of the game stage that is a shooting target. In addition, since the map image camera performs shooting by parallel projection, the position/direction data 409 of the map image camera does not include data of the angle of view of the map image camera.

The capture map image data 410 is data indicating a capture map image of the entirety of a game stage, which is obtained by screen-capturing a rendered map image of the entirety of the game stage, which is generated by imaging with the map image camera.

The map enlargement factor data 411 is data indicating an enlargement factor at which a capture map image is displayed on the television 2. Specifically, the enlargement factor is minimum when a capture map image of the entirety of a game stage is displayed on the television 2. When a capture map image of a certain area of a game stage is displayed on the television 2, the enlargement factor is set in accordance with the size of the certain area.

Next, with reference to FIG. 12 to FIG. 17, a flow of the game process executed by the game apparatus 3 will be described. When the game apparatus 3 is powered on, the CPU 10 of the game apparatus 3 executes the boot program stored in the ROM/RTC 13, whereby units such as the external main memory 12 are initialized. Then, a game program stored in the optical disc 4 is loaded onto the external main memory 12, and the CPU 10 starts to execute the game program.

Figure 12:
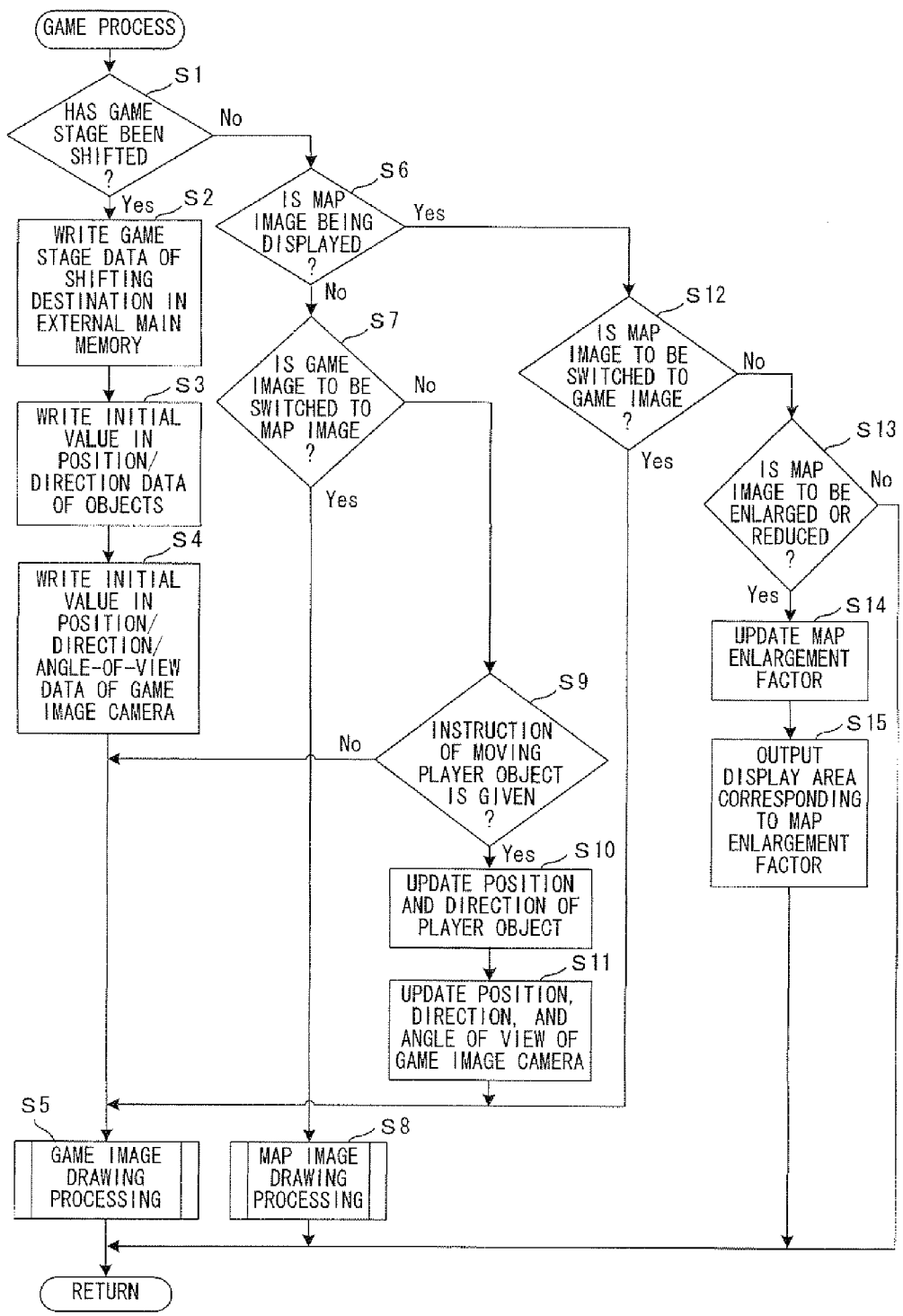
FIG. 12 is an example of a flowchart of game processing executed by a CPU 10.

FIG. 12 is an example of a flowchart of the game process executed by the CPU 10. The process shown in the flowchart in FIG. 12 is repeatedly executed every frame (for example, every 1/60 second). It is noted that the description of other game processes which do not directly relate to example embodiments of the present invention is omitted below.

First, in step S1, the CPU 10 determines whether or not a game stage has been shifted. If the result of the determination in step S1 is YES, the process proceeds to step S2. Here, in the case where processing of step S1 is performed for the first time after the game process is started, the CPU 10 determines YES in step S1. On the other hand, if the result of the determination in step S1 is NO, the process proceeds to step S6. It is noted that if a game stage (e.g., an island stage) has been, for example, cleared, the stage is shifted (switched) to the next stage (e.g., a mountain stage).

In step S2, the CPU 10 writes, as the game stage data 402, data of a game stage of the shifting destination (or the first game stage) stored in the optical disc 4, into the external main memory 12. Thereafter, the process proceeds to step S3. It is noted that hereinafter, a game stage generated based on the game stage data 402 written in the external main memory 12 may be referred to as the present game stage.

In step S3, the CPU 10 writes, as the position/direction data 407 of objects, into the external main memory 12, initial value data of the positions and the directions of objects such as a player and enemies corresponding to the game stage data 402 written into the external main memory 12 in step S2. Thereafter, the process proceeds to step S4.

In step S4, the CPU 10 writes, as the position/direction/angle-of-view data 408 of the game image camera, into the external main memory 12, initial value data of the position, the direction, and the angle of view of the game image camera corresponding to the game stage data 402 written into the external main memory 12 in step S2. Thereafter, the process proceeds to step S5.

In step S5, the GPU 11b of the system LSI 11 executes game image drawing processing to generate a game image.

Figure 13:
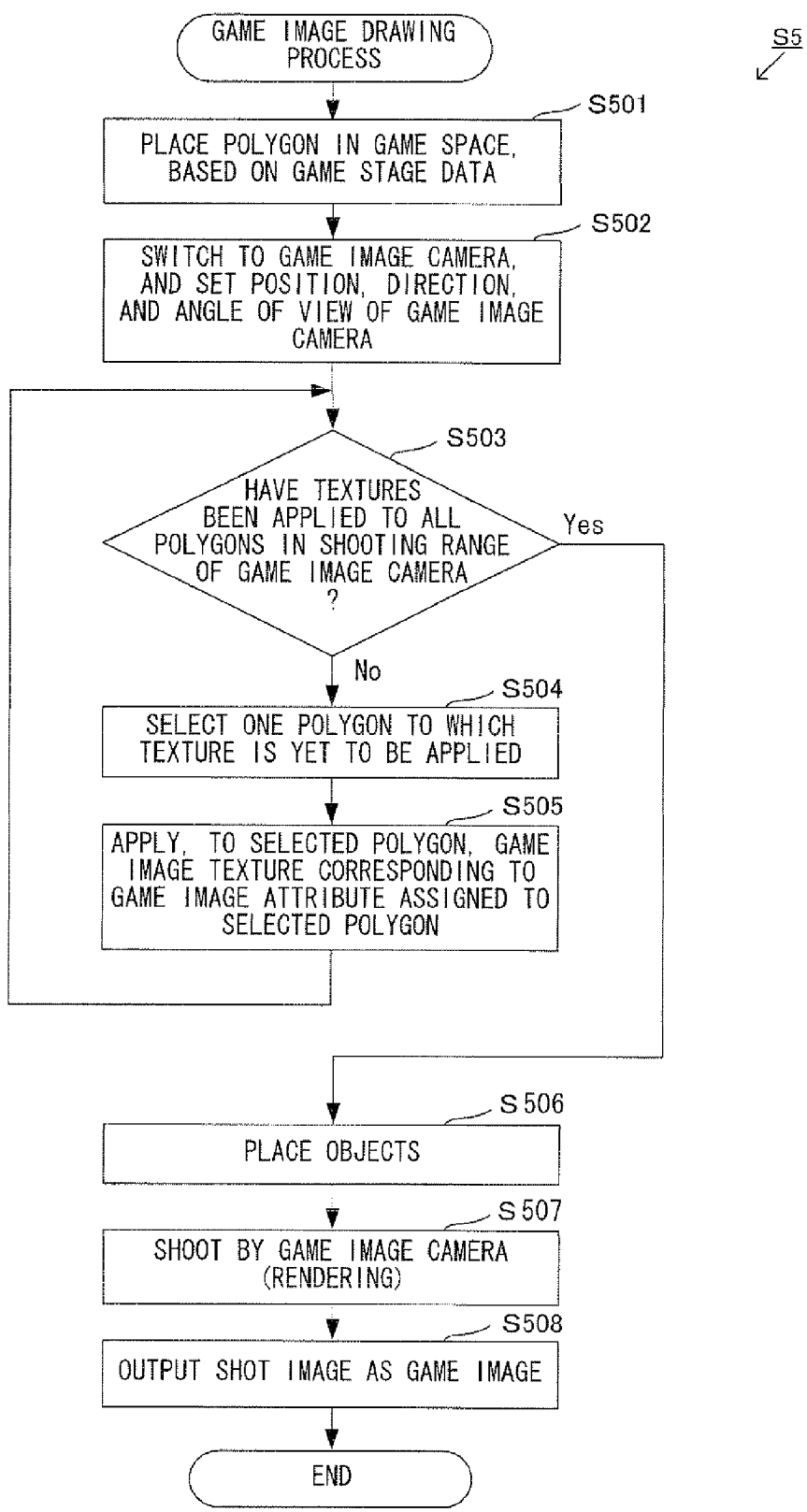
FIG. 13 is an example of a flowchart of game image drawing processing executed by a GPU 11$b$.

FIG. 13 is an example of a flowchart of the game image drawing processing executed by the GPU 11b. Hereinafter, with reference to FIG. 13, the game image drawing processing of step S5 in FIG. 12 will be described.

First, in step S501, based on the game stage data 402 (see FIG. 11) written in the external main memory 12, the GPU 11b places polygons in the game space. Specifically, the GPU 11b places polygons in the game space by using the polygon vertex coordinate data 4021, and thereby forms the shapes (terrain etc.) on the present game stage, in the game space. Thereafter, the process proceeds to step S502.

Figure 14:
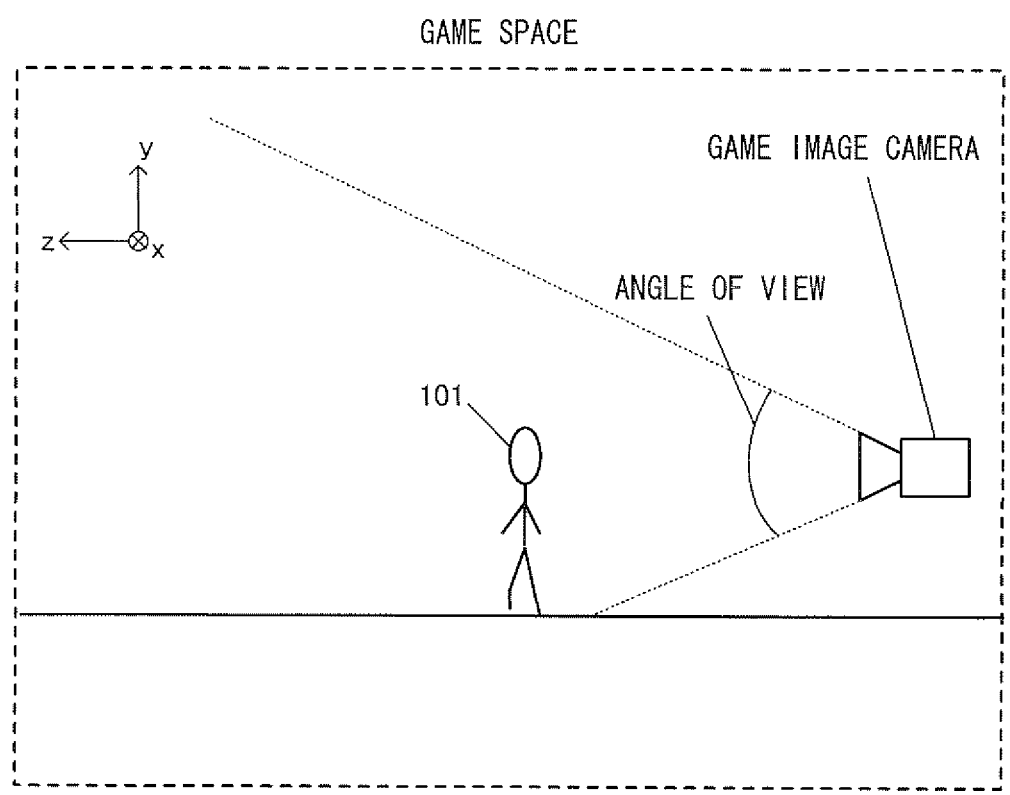
FIG. 14 is a diagram for explaining the position, direction (shooting direction), and angle of view of a game image camera.

In step S502, the GPU 11b switches a virtual camera to be used to the game image camera, and sets the position, the direction (shooting direction), and the angle of view of the game image camera in the game space in accordance with the position/direction/angle-of-view data 408 of the game image camera written in the external main memory 12. Here, the position, the direction (shooting direction), and the angle of view of the game image camera are set such that, for example, the player object 101 is shot from the back as shown in FIG. 14. Thereafter, the process proceeds to step S503.

In step S503, the GPU 11b determines whether or not game image textures have been applied to all the polygons present within the shooting area of the game image camera. If the result of the determination in step S503 is YES, processing of applying game image textures to the polygons is completed, and the process proceeds to step S506. On the other hand, the result of the determination in step S503 is NO, the process proceeds to step S504.

In step S504, the GPU 11b selects one polygon to which a game image texture is yet to be applied, from among the polygons present within the shooting area of the game image camera. Thereafter, the process proceeds to step S505.

In step S505, the GPU 11b applies (maps), to the polygon selected in step S504, a game image texture corresponding to a game image attribute assigned to the polygon. Specifically, by referring to the game image attribute data 4022, the GPU 11b specifies the game image attribute assigned to the polygon selected in step S504, and thereafter, by referring to the game image texture data 403, the GPU 11b applies, to the polygon, the game image texture corresponding to the specified game image attribute. For example, if the game image attribute of "grass" is assigned to the polygon selected in step S504, the GPU 11b applies, to the polygon, a texture of grass represented by the game image texture data 4031 of grass. Thereafter, the process returns to step S503.

Then, processing of steps S503, S504, and S505 is repeated, whereby game image textures are applied to all the polygons (YES in step S503), and then the process proceeds to step S506.

In step S506, based on the game image OBJ data 404 and the position/direction data 407 of objects written in the external main memory 12, the GPU 11b places objects (player, enemies, weapons, etc.) in the game space. Thereafter, the process proceeds to step S507.

In step S507, the GPU 11b shoots (renders) the game space by the game image camera set in step S502. Thereafter, the process proceeds to step S508.

In step S508, the GPU 11b outputs an image shot in step S507 as a game image to the television 2 via the AV-IC 15 or the like. Thereafter, the game image drawing processing of step S5 in FIG. 12 is ended, and the process returns to step S1 in FIG. 12.

As described above, if a game stage is shifted (or a game is started), processing from step S1 to step S5 is performed, whereby a game image (see FIG. 8) is generated and displayed on the television 2.

Hereinafter, the case where a stage is not shifted (No in step S1) will be described.

In this case, in step S6, the CPU 10 determines whether or not a map image (see FIG. 1) is currently displayed on the television 2. If the result of the determination of step S6 is YES, the process proceeds to step S12. On the other hand, if the result of the determination of step S6 is NO, the process proceeds to step S7.

In step S7, the CPU 10 determines whether or not to switch a display of a game image to a display of a map image. Specifically, by referring to the operation data 401 stored in the external main memory 12, the CPU 10 determines whether or not an operation of switching to a display of a map image has been performed by the player pressing the plus button (see 72g in FIG. 3) of the controller 7. If the result of the determination of step S7 is YES, the process proceeds to step S8. On the other hand, if the result of the determination of step S7 is NO, the process proceeds to step S9.

In step S8, the GPU 11b of the system LSI 11 executes map image drawing processing to generate a map image.

Figure 15:
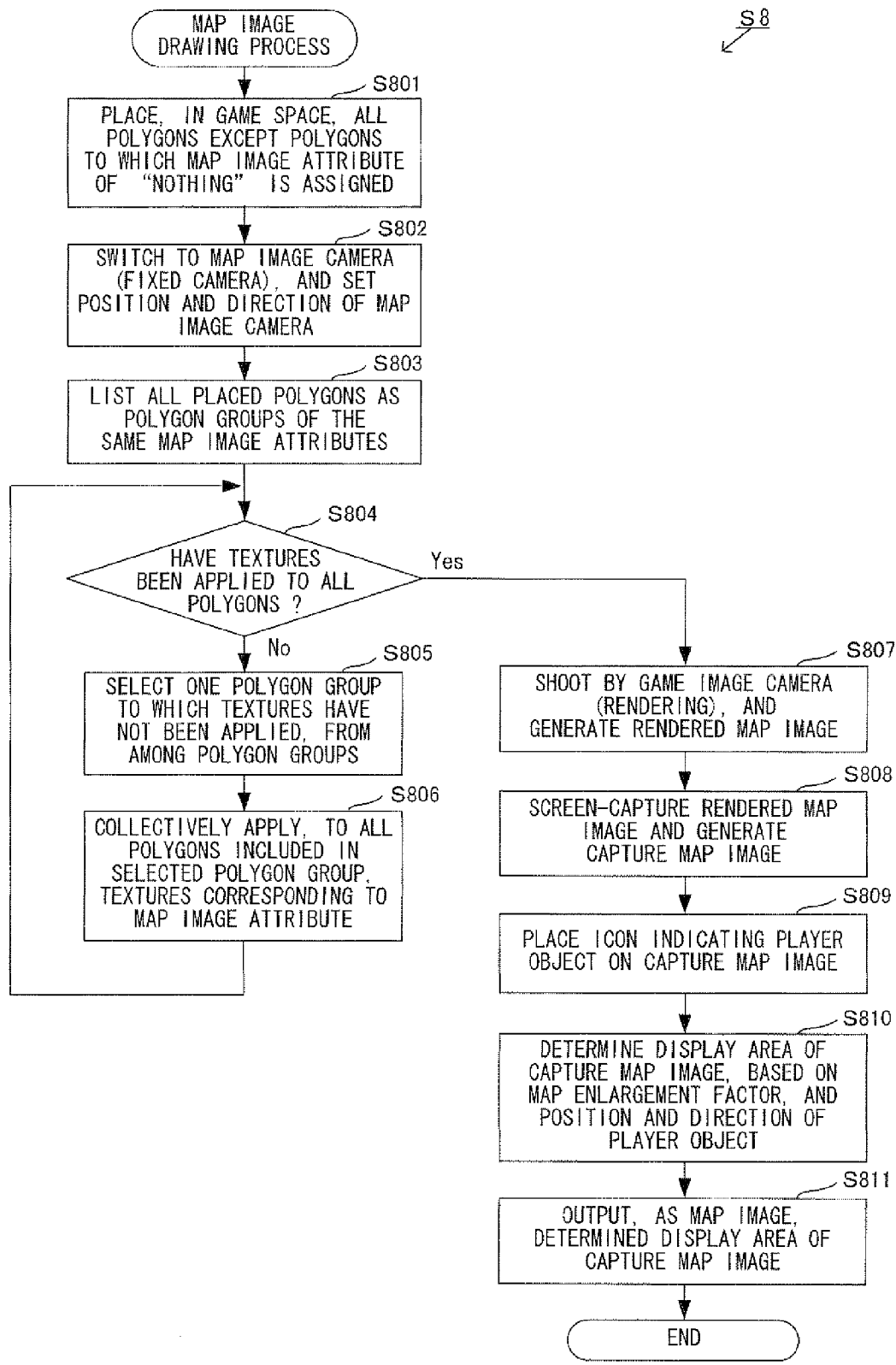
FIG. 15 is an example of a flowchart of map image drawing processing executed by the GPU 11$b$.

FIG. 15 is an example of a flowchart of the map image drawing processing executed by the GPU 11b. Hereinafter, with reference to FIG. 15, the map image drawing processing of step S8 in FIG. 12 will be described.

First, in step S801, based on the game stage data 402 (see FIG. 11) stored in the external main memory 12, the GPU 11b places all polygons except polygons to which the map image attribute of "nothing" is assigned, in the game space (the present game stage). Specifically, by using the polygon vertex coordinate data 4021 and the map image attribute data 4023, the GPU 11b places all polygons except polygons to which the map image attribute of "nothing" is assigned, in the game space, thereby forming shapes (terrain etc.) on the present game stage in the game space. Thereafter, the process proceeds to step S802.

In step S802, the GPU 11b switches the virtual camera to be used to the map image camera, and sets the position and the direction (shooting direction) of the map image camera in the game space in accordance with the position/direction data 409 of the map image camera stored in the external main memory 12. Here, the position and the direction (shooting direction) of the map image camera is set such that the present game stage is shot by the map image camera looking vertically down on the present game stage from above (so as to take the overhead view) as exemplified in FIG. 16. It is noted that as previously described, the map image camera shoots the entirety of the present game stage by parallel projection. Thereafter, the process proceeds to step S803.

In step S803, the GPU 11b lists, as polygon groups, all the polygons placed in step S801 such that each polygon group includes polygons to which the same map image attribute is assigned. Thereafter, the process proceeds to step S804.

In step S804, the GPU 11b determines whether or not map image textures have been applied to all the polygons placed in step S801. If the result of the determination of step S804 is YES, processing of applying map image textures to polygons is completed, and the process proceeds to step S807. On the other hand, if the result of the determination of step S804 is NO, the process proceeds to step S805.

In step S805, the GPU 11b selects one polygon group including polygons to which map image textures are yet to be applied, from among the polygon groups of the polygons listed in step S803. Thereafter, the process proceeds to step S806.

In step S806, the GPU 11b applies (maps), to all the polygons included in the polygon group selected in step S806, map image textures corresponding to the map image attribute assigned to the polygons, in a lump. More specifically, by referring to the map image attribute data 4023, the GPU 11b specifies the map image attribute assigned to the polygons included in the polygon group selected in step S805. Thereafter, by referring to the map image texture data 405, the GPU 11b applies, to all the polygons included in the polygon group, map image textures corresponding to the specified map image attribute, in a lump. For example, if the map image attribute of "grass" is assigned to the polygons included in the polygon group selected in step S805, the GPU 11b applies, to all the polygons included in the polygon group, textures of grass represented by the map image texture data 4051 of grass, in a lump. Thereafter, the process returns to step S804.

Then, processing of steps S804, S805, and S806 is repeated, whereby map image textures are applied to all the polygons (all the polygon groups) (YES in step S804), and then the process proceeds to step S807.

Figure 16:
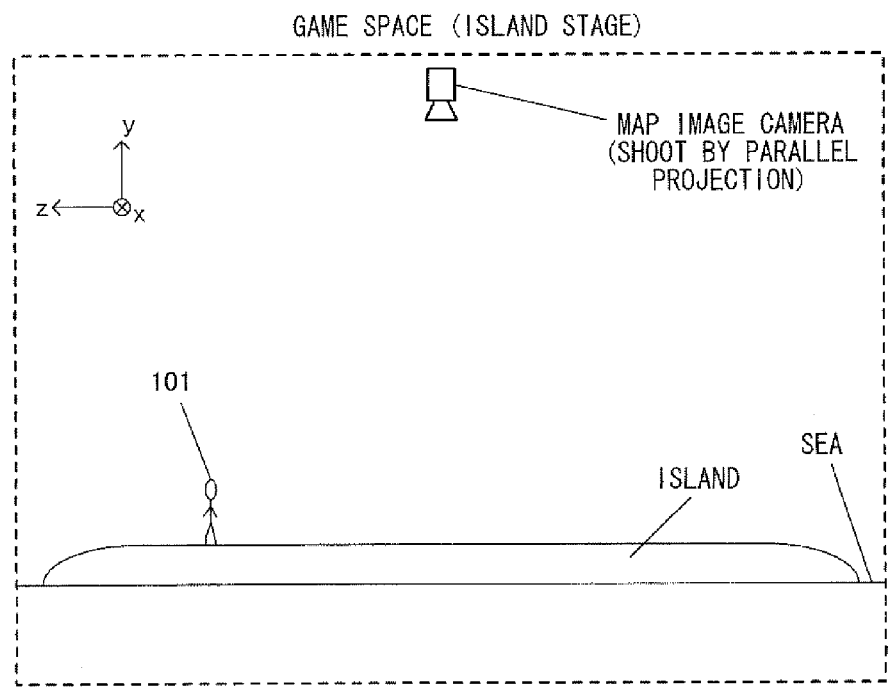
FIG. 16 is a diagram showing an example of the position and direction (shooting direction) of a map image camera.
Figure 17:
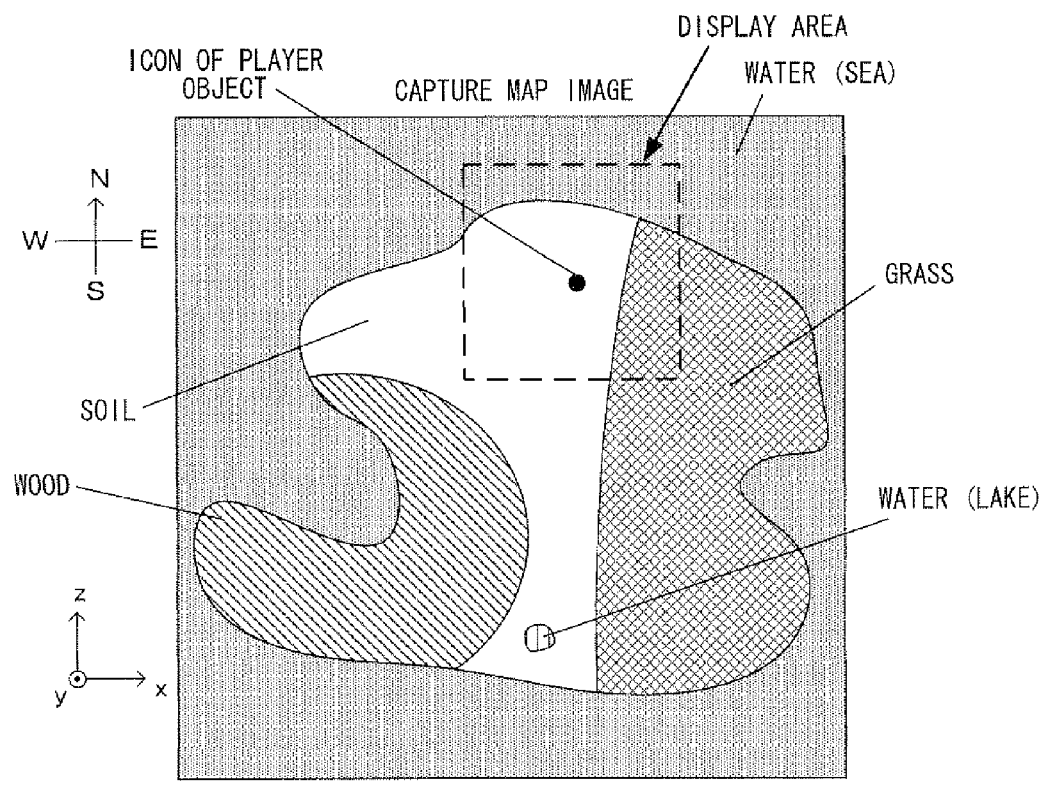
FIG. 17 is a diagram for explaining an area of a capture map image to be displayed as a map image.

In step S807, the GPU 11b shoots (renders) the game space by the map image camera set in step S802, and thereby generates a rendered map image. It is noted that as previously described, the map image camera shoots the entirety of the present game stage by parallel projection by looking vertically down on the present game stage from above (so as to take the overhead view) as shown in FIG. 16. Thereafter, the process proceeds to step S808.

In step S808, the GPU 11b screen-captures the rendered map image shot in step S807, thereby generating a capture map image formed by paint data, and stores the capture map image as the capture map image data 410 in the external main memory 12 (or updates the captured map image data 410 to the capture map image). Thereafter, the process proceeds to step S809. It is noted that the above paint data is data configuring a paint image, and is sometimes called bit map data or raster graphic data. Therefore, a paint image may be referred to as a raster graphic image.

In step S809, the GPU 11b places an icon indicating the player object 101 on the capture map image generated in step S808, in accordance with the map image OBJ data 406 and the position/direction data 407 of objects stored in the external main memory 12. Thereafter, the process proceeds to step S810.

In step S810, the GPU 11b determines an area of the capture map image to be displayed as a map image on the television 2, based on the map enlargement factor data 411 and the position/direction data 407 of objects stored in the external main memory 12. Specifically, as exemplified in FIG. 17, the GPU 11b determines a display area of the capture map image that includes the player object at the vicinity of the center of the display area, and that has a size corresponding to an enlargement factor indicated by the map enlargement factor data 411. Thereafter, the process proceeds to step S811.

In step S811, the GPU 11b outputs, as a map image, the display area of the capture map image determined in step S810 to the television 2 via the AV-IC 15 and the like. Thereafter, the map image drawing processing of step S8 in FIG. 12 is ended, the process returns to step S1 in FIG. 12.

As described above, if the player performs an operation of switching a game image to a map image (YES in step S7), the map image drawing processing of step S8 is performed to generate a map image (see FIG. 10) and display the map image on the television 2.

Hereinafter, the case where an operation of switching a game image to a map image has not been performed (NO in step S7) will be described.

In this case, in step S9, the CPU 10 determines whether or not the player has given instructions of moving the player object 101. Specifically, by referring to the operation data 401 stored in the external main memory 12, the CPU 10 determines whether or not the player has given instructions of moving the player object 101 by operating the analog stick 39 (see FIG. 9) of the extended controller 36. If the result of the determination of step S9 is YES, the process proceeds to step S10. On the other hand, if the result of the determination of step S9 is NO, the process proceeds to step S5.

If the CPU 10 has determined NO in step S9 and the process has proceeded to the game image drawing processing (see FIG. 13) of step S5, the player object 101 does not move on a game image. Therefore, in the game image drawing processing of step S5 at this time, if, for example, an object such as an enemy has moved, a game image in which the movement is reflected is generated. Thereafter, the process returns to step S1.

In step S10, the CPU 10 updates the position/direction data 407 of objects stored in the external main memory 12 to the latest position and the latest direction of the player object 101, in accordance with the operation data 401 stored in the external main memory 12. Thereafter, the process proceeds to step S11.

In step S11, the CPU 10 updates the position/direction/angle-of-view data 408 of the game image camera stored in the external main memory 12 to the latest position, the latest direction, and the latest angle of view of the game image camera. Here, as exemplified in FIG. 8 and FIG. 14, the game image camera shoots toward the player object 101 from the back at a predetermined distance from the player object 101. In addition, the angle of view of the game image camera is changed in accordance with a predetermined condition (for example, its position on the game stage). Thus, the position, the direction, and the angle of view of the game image camera are changed in accordance with a movement and a change in the direction of the player object 101. Thereafter, the process proceeds to step S5.

If the process has proceeded to the game image drawing processing (see FIG. 13) of step S5 after step S11, the player object 101 is to move on a game image. Therefore, in the game image drawing processing of step S5 at this time, the player object 101 moves, and a game image shot by the game image camera whose position, direction, and angle of view have changed in accordance with the movement of the player object, is generated. It is noted that along with the movement, objects such as enemies can move. Thereafter, the process returns to step S1.

Hereinafter, the case where a map image is displayed on the television 2 (YES in step S6) will be described.

In this case, in step S12, the CPU 10 determines whether or not to switch a display of a map image to a display of a game image. Specifically, by referring to the operation data 401 stored in the external main memory 12, the CPU 10 determines whether or not an operation of switching to a display of a game image has been performed by the player pressing the plus button (see 72g in FIG. 3) of the controller 7. If the result of the determination of step S12 is YES, the process proceeds to the game image drawing processing of step S5. On the other hand, if the result of the determination of step S12 is NO, the process proceeds to step S13.

If the CPU 10 has determined YES in step S12 and the process has proceeded to step S5, a game image is generated and displayed on the television 2 through the game image drawing processing in FIG. 13. Therefore, in the game image drawing processing of step S5 at this time, a game image present just before it was switched to a map image in the latest map image drawing processing (step S8) is generated as a display image. Thereafter, the process returns to step S1.

On the other hand, in step S13, the CPU 10 determines whether or not to enlarge or reduce a map image displayed on the television 2. Specifically, by referring to the operation data 401 stored in the external main memory 12, the CPU 10 determines whether or not an operation of enlarging or reducing (zooming in or out) the map image has been performed by the player pressing the right or left operation portion of the cross key (see 72a in FIG. 3) of the controller 7. If the result of the determination of step S13 is YES, the process proceeds to step S14. On the other hand, if the result of the determination of step S12 is NO, the process returns to step S1.

In step S14, based on the operation data 401 stored in the external main memory 12, the CPU 10 updates the map enlargement factor data 411 stored in the external main memory 12. Specifically, by referring to the operation data 401, the CPU 10 specifies an operation of enlarging and reducing (zooming in or out) the map image performed by the player, and updates the map enlargement factor data 411 to an enlargement factor corresponding to the specified operation. Thereafter, the process proceeds to step S15.

In step S15, in accordance with the enlargement factor indicated by the map enlargement factor data 411 updated in step S14, the GPU 11b determines a display area (see FIG. 17) of the capture map image represented by the captured map image data 410, and outputs the determined display area as a map image to the television 2 via the AV-IC 15 and the like. Thereafter, the process returns to step S1.

As described above, if the player has performed an operation of enlarging or reducing a map image (YES in step S13), a map image displayed on the television 2 is enlarged or reduced (zoomed in or out) through processing of steps S14 and S15.

According to the embodiment of the present invention described above, since a map image is generated by using game stage data (data that relates to polygons) used for generation of a game image, it is not necessary to separately prepare a map image for each game stage. Thus, storage spaces of storage media such as the optical disc 4 and an ROM, and memories (RAM) such as the external main memory 12 can be saved. In addition, in the case where processing of change of terrain such as "crustal change" is performed in one game stage, the change of terrain can be immediately reflected in a map image. Moreover, at a stage of manufacturing a game, if game stage data is changed, a map image to be generated is also changed along with the change of the game stage data. Therefore, a load on manufacturers is reduced.

[Modifications]

It is noted that in the embodiment described above, game image textures are applied to polygons one by one in the game image drawing processing in FIG. 13 (steps S504 and S505). However, in the game image drawing processing in FIG. 13, polygons (polygon group) to which the same game image attribute is applied may be specified and game image textures may be applied to the specified polygon group in a lump in the same manner as in the map image drawing processing in FIG. 15. In this case, processing of listing, as polygon groups, all the polygons present within the shooting area of the game image camera such that each polygon group includes polygons to which the same map image attribute is assigned, is added just after step S502 in the game image drawing processing in FIG. 13. Then, in step S504, one polygon group including polygons to which textures are yet to be applied is selected, and in step S505, game image textures are applied to the polygons included in the selected polygon group, in a lump. Thus, a load of processing of generating a game image is reduced.

In addition, in the embodiment described above, the map image drawing processing in FIG. 15 does not place, in the game space, polygons to which the map image attribute of "nothing" is assigned, and thereby omits, from a map image, shapes (a pebble, a fallen leaf, and the like) which do not need to be depicted on the map image. However, while placing, in the game space, polygons to which the map image attribute of "nothing" is assigned, the map image drawing processing in FIG. 15 may prevent map image textures from being applied to polygons to which the map image attribute of "nothing" is assigned, thereby omitting, from a map image, shapes (a pebble, a fallen leaf, and the like) which do not need to be depicted on the map image. In this case, the map image drawing processing in FIG. 15 is modified to map image drawing processing shown in FIG. 18. Specifically, step S801 in FIG. 15 is replaced by step S901 (processing of placing all polygons in the game space) in FIG. 18, step S804 in FIG. 15 is replaced by step S904 (processing of determining whether or not textures have been applied to all polygons except polygons to which the map image attribute of "nothing" is assigned) in FIG. 18, and step S805 in FIG. 15 is replaced by step S905 (processing of selecting one polygon group including polygons to which textures are yet to be applied, from among polygon groups except polygon groups including polygons to which the map image attribute of "nothing" is assigned) in FIG. 18.

In addition, in the embodiment described above, the game image drawing processing in FIG. 13 places all polygons to form the entirety of the present game stage (step S501), and applies game image textures to only polygons present within the shooting area of the game image camera (steps S503 to S505). However, in step S501, only the polygons present within the shooting area of the game image camera may be placed in the game space. Thus, a load of processing of placing polygons is reduced.

In addition, in the embodiment described above, the map image drawing processing in FIG. 15 places all polygons except polygons to which the map image attribute of "nothing" is assigned, to form the entirety of the present game stage (step S801), and shoots the entirety of the present game stage by the map image camera (step S807). However, in step S807 in FIG. 15, a certain area of the present game stage including the position of the player object 101 (for example, an area including the position of the player object 101, among four divided areas of the present stage) may be shot by the map image camera. Moreover, in this case, polygons present within the shooting area of the map image camera except polygons to which the map image attribute of "nothing" is assigned may be placed, in step S801 in FIG. 15. Thus, a load of processing of placing polygons is reduced. It is noted that in this case, the area outside the shot certain area is not displayed on a map image.

Figure 18:
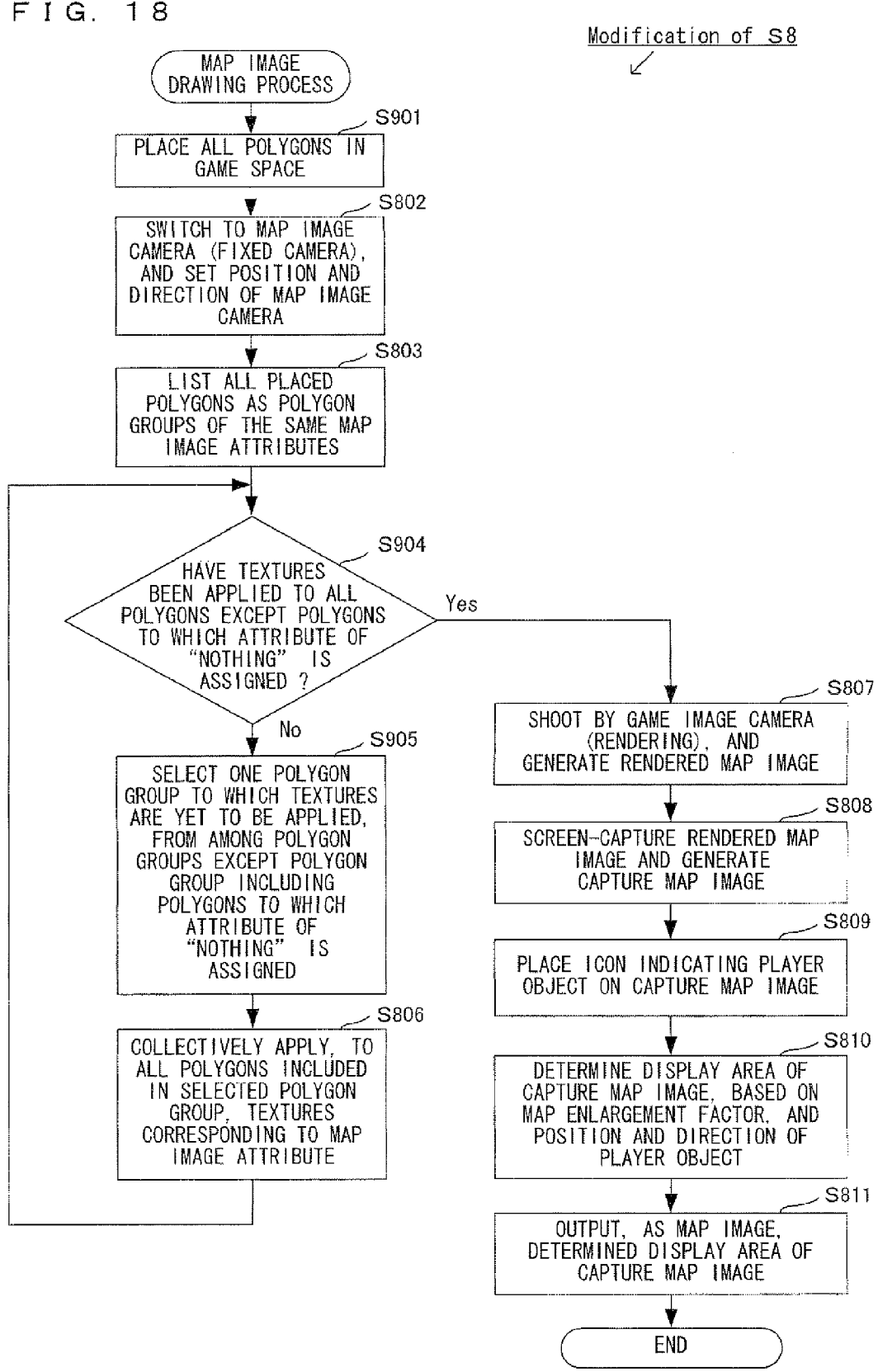
FIG. 18 is another example of a flowchart of the map image drawing processing executed by the GPU 11$b$.

In addition, the map image drawing processing in FIG. 18 described above places all polygons to form the entirety of the present game stage (step S901), and shoots the entirety of the present game stage by the map image camera (step S807). However, in step S807 in FIG. 18, a certain area of the present game stage including the position of the player object 101 (for example, an area including the position of the player object 101, among four divided areas of the present stage) may be shot by the map image camera. Moreover, in this case, in step S901 in FIG. 18, polygons present within the shooting area of the map image camera may be placed. Thus, a load of processing of placing polygons is reduced. It is noted that in this case, the area outside the shot certain area is not displayed on a map image.

In addition, in the embodiment described above, as shown in FIG. 8 and FIG. 14, the game image camera shoots toward the player object 101 from the back to generate a game image. However, the game image camera shoots toward the player object 101 from any direction to form a game image. For example, the game image camera may shoot toward the player object 101 from the front, or may shoot toward the player object 101 from the above. In addition, the game image camera may shoot from a perspective of the player object 101.

In addition, in the embodiment described above, the map image drawing processing in FIG. 15 screen-captures a rendered map image and converts the resultant data to a capture map image (step S808). However, processing of step S808 of the conversion may not be performed. In this case, in step S811, a display area of the rendered map image is outputted as a map image.

In addition, in the embodiment described above, the game stage data 402 includes the game image attribute data 4022 and the map image attribute data 4023. However, the game stage data 402 may not include the map image attribute data 4023. In this case, upon generation of a game image, game image textures are applied to polygons, based on the game image attributes, and also upon generation of a map image, map image textures are applied to polygons, based on the game image attributes.

In addition, in the embodiment described above, one of a game image and a map image is displayed on the screen of the television 2 while the display being switched between the game image and the map image in accordance with an operation of the player (see FIG. 12). However, a map image smaller than a game image may be displayed so as to overlap with the game image. Alternatively, a game image and a map image may be separately displayed on the screen of the television 2 so as not to overlap with each other. Alternatively, a game image and a map image may be respectively displayed on two display sections. Specifically, a game image may be displayed on the screen of the television 2, and a map image may be displayed on a display section of a mobile terminal or the like (not shown); or a game image may be displayed on one of two or more display apparatuses provided to a game apparatus, and a map image may be displayed on another one of the two or more display apparatuses.

In addition, in the embodiment described above, it is preferable that the image size of a map image texture applied to a polygon in the map image drawing processing (see FIG. 15) is smaller than the image size of a game image texture applied to a polygon in the game image drawing processing (see FIG. 13). Moreover, the size (image size) of a map image texture may be set to be significantly smaller than the size of a polygon, and a plurality of map image textures may be applied to a polygon such that they are arranged on the polygon. Thus, the data size of the map image texture data 405 (see FIG. 11) is reduced, storage spaces of storage media and memories can be saved.

It is noted that in the case where the image size of the map image texture is set to be large, patterns that the map image texture can represent increase though the data size cannot be reduced unlike the above case.

In addition, in the embodiment described above, a map image may be rotated in accordance with the direction of the player object 101 or the shooting direction of the game image camera. For example, a map image may be displayed on the television 2 while being rotated such that the direction in which the player object 101 faces always coincides with the upward direction on the television 2. Moreover, the direction of a map image may be changed in accordance with the enlargement factor of the map image. For example, when the enlargement factor of a map image is large, the map image may be rotated such that the direction in which the player object 101 faces always coincides with the upward direction on the television 2, and when the enlargement factor of the map image is small, the map image may be displayed on the television 2 such that the map image is not rotated (for example, the map image is fixed, with its northward direction being in the upward direction on the television 2). Thus, a map image is provided such that when the enlargement factor of the map image is large, the direction in which the player object 101 faces always coincides with a predetermined direction on the television 2, and such that when the enlargement factor of the map image is small, the entirety of a game stage can be grasped. As a result, the direction of a display of a map image can be selected in accordance with purposes.

In addition, in the embodiment described above, icons indicating objects such as enemies are not displayed on a map image. However, icons indicating objects such as enemies as well as an icon indicating the player object 101 may be displayed on a map image.

In addition, in the embodiment described above, the player can move the player object 101 only when a game image is displayed on the television 2. However, the player may be allowed to move the player object 101 also when a map image is displayed on the television 2.

Figure 19:
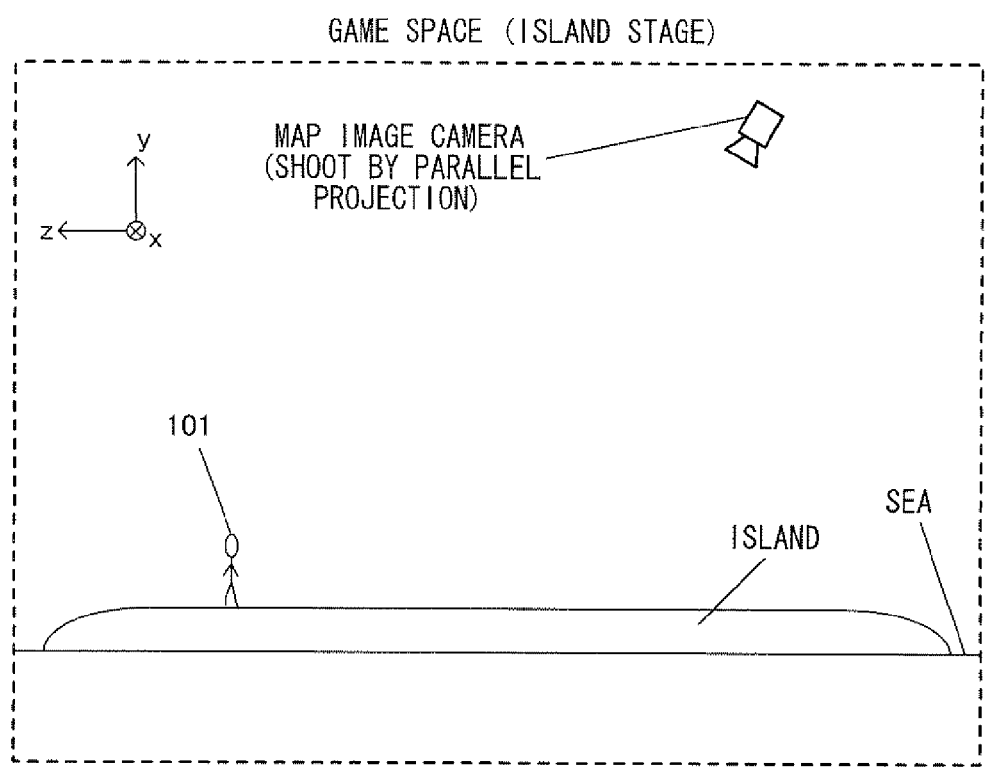
FIG. 19 is a diagram showing another example of the position and direction (shooting direction) of the map image camera.

In addition, in the embodiment described above, the map image camera shoots an image by looking vertically down on the game space (the present game stage) from above (see FIG. 16). However, as exemplified in FIG. 19, the map image camera may shoot an image by looking obliquely down on the game space (the present game stage) from above. Alternatively, the map image camera may shoot an image by looking up at the game space (the present game stage) from below. Such shooting may be performed when, for example, on a game stage on which the player object 101 swims under a sea, a map image is to be generated with the map image camera looking upward from the bottom of the sea. Alternatively, the map image camera may shoot an image by laterally looking at the game space (the present game stage). Such shooting may be performed when, for example, on a game stage on which the player object 101 moves in a building or in a hole, a map image is to be generated with the map image camera laterally looking at the building or the hole.

In addition, in the embodiment described above, the map image camera shoots the game space (the present game stage) by parallel projection. However, a method of shooting by the map image camera is not limited thereto.

In addition, in the embodiment described above, example embodiments of the present invention may be realized by using a stationary game apparatus (see FIG. 1). However, example embodiments of the present invention may be realized in other forms, for example, by using a hand-held game apparatus, a personal computer, a mobile telephone, or a mobile information terminal.

In addition, in the embodiment described above, a map image texture may be a texture that executes an animation displaying a plurality of images (frames) while switching therebetween. For example, a texture that executes an animation in which waves are rolling is used as a map image texture representing a sea, thereby enabling a map image to be dynamic.

In addition, in the embodiment described above, each of the game image drawing processing in FIG. 13 and the map image drawing processing in FIG. 15 applies textures to polygons, based on the attributes assigned to the polygons. However, each of the game image drawing processing in FIG. 13 and the map image drawing processing in FIG. 15 may apply textures on polygons, based on the attributes assigned to the polygons, and time information indicating actual or virtual time, a season, or the like. For example, in the case where the attribute of "grass" is assigned to a polygon, if the time information indicates "spring", a texture of grass with flowers may be applied to the polygon, and if the time information indicates "autumn", a texture of dead grass may be applied to the polygon. In addition, in a similar manner to this, a texture may also be changed in accordance with whether during the day or during the night.

In addition, in the embodiment described above, every time a game image is switched to a map image, a capture map image is generated, and the generated capture map image is used also when the map image is enlarged or reduced to be displayed (see FIG. 12). However, every time the map image is enlarged or reduced to be displayed, a capture map image may be generated. In this case, when a map image is to be enlarged or reduced, an image obtained by shooting the entirety of the game stage may be screen-captured, a display area corresponding to an enlargement factor of the map image may be cut out from the obtained capture map image, and the display area may be outputted as the map image. Alternatively, in this case, when a map image is to be enlarged or reduced, a shooting area corresponding to an enlargement factor of the map image may be set for the map image camera, and an image shot based on the shooting area may be directly outputted as the map image. In addition, every time a game stage is shifted (YES in step S1 in FIG. 12), a capture map image may be generated. This method of generating a capture map image every time a game stage is shifted can reduce a load of processing of generating a map image. On the other hand, the method of generating a capture map image every time a game image is switched to a map image or every time a map image is enlarged or reduced, can reflect a change in a game stage (for example, a change in terrain) in the map image during progression of a game on the game stage.

In addition, in the embodiment described above, only the map image attributes include the attribute of "nothing", and the game image attributes do not include the attribute of "nothing". However, on the contrary, only the game image attributes may include the attribute of "nothing". Thus, a polygon that is displayed only on a map image and is not displayed on a game image, is generated, and thereby the map image can be treated as a map indicating the position of a hidden treasure, for example.

In addition, in the embodiment described above, when a display image on the television 2 is to be switched from a game image to a map image, the switching may be performed with a significant visual effect instead of performing momentary switching. For example, a game image may be continuously and smoothly varied from an image obtained when the player object 101 is viewed from the back, to an image obtained when the player object 101 is viewed from above. Thereafter, a map image may be superimposed on the varied game image while the map image fading in, and then the game image may fade out to be completely switched to the map image. By applying such a visual effect, even if virtual cameras used for a game image and a map image are different from each other, it is possible to give the player an impression that the game image camera moves to a position at which the game image camera looks down on the player object 101, and that thereby the map image is displayed.

In addition, in the embodiment described above, polygons that are not to be placed upon generation of a map image, or polygons to which textures are not to be applied upon generation of a map image may be determined based on a height (see FIG. 14 etc.) indicated by the y-axis of the game space. Alternatively, based on the height, polygons to which the map image attribute of "nothing" is to be assigned may be determined. Hereinafter, these respects will be specifically described.

For example, in the case where a "tree" or the like formed by polygons is present at a position (whose y-coordinate is larger than that of a ground) higher than a ground in the game space, if the tree is displayed on a map image, it is difficult to see the ground on the map image. Accordingly, polygons present at a position higher than the ground in the game space are not placed upon generation of a map image. Alternatively, textures are not applied to the polygons though the polygons are placed upon generation of a map image. Alternatively, the map image attribute of "nothing" is assigned, in advance, to the polygons present at a position higher than the ground in the game space. Thus, the "tree" can be prevented from being depicted on a map image, in the map image drawing processing in FIG. 15 or 18.

For example, the case where polygons present at a position higher than a ground in the game space are not placed in the map image drawing processing in FIG. 15 is assumed. In this case, in step S801 in FIG. 15, polygons except polygons to which the map image attribute of "nothing" is assigned, and except polygons present at a position higher than the height of the ground (a predetermined value), are placed in the game space.

In addition, for example, the case where polygons present at a position higher than a ground in the game space are not placed in the map image drawing processing in FIG. 18 is assumed. In this case, in step S901 in FIG. 18, polygons except polygons present at a position higher than the height of the ground (a predetermined value), are placed in the game space.

In addition, for example, the case where textures are not applied to polygons present at a position higher than a ground in the game space in the map image drawing processing in FIG. 15 is assumed. In this case, in step S803 in FIG. 15, all polygons placed in step S801 except polygons present at the position higher than the height of the ground (a predetermined value) in the game space are listed as polygons groups. Then, in steps S804 to S806, textures are applied to the listed polygons.

In addition, for example, the case where textures are not applied to polygons present at a position higher than a ground in the game space in the map image drawing processing in FIG. 18 is assumed. In this case, in step S803 in FIG. 18, all polygons placed in step S801 except polygons present at the position higher than the height of the ground (a predetermined value) in the game space are listed as polygons groups.

Then, in steps S904, S905, and S806, textures are applied to the listed polygons except polygons to which the attribute of "nothing" is applied.

In addition, as a modification of the embodiment described above, the case where a detailed map image having a large enlargement factor, and a whole map image having a small enlargement factor are generated is assumed. In this case, in processing of generating the detailed map image, as described above, polygons present at a position higher than a ground may not be placed. Alternatively, in processing of generating the detailed map image, textures may not be applied to the polygons though the polygons are placed. Alternatively, in processing of generating the detailed map image, the "tree" may be prevented from appearing on the detailed map image by assigning the map image attribute of "nothing" to the polygons. Meanwhile, in processing of generating the whole map image, polygons forming the tree may also be placed, or textures may be applied also to the polygons. Thus, a road and the like hidden under the tree are displayed on the detailed map image, and a forest is displayed on the whole map, whereby two map images can be selectively used.

In addition, for example, in the game place, in the case where the player object 101 is present on the first floor of a construction such as a building which has a plurality of floors, the player object 101 is hidden because polygons forming the second floor, the roof, or the like are depicted upon generation of a map image. Accordingly, in the game space, polygons present at a position higher than the position of the player object 101 are not placed upon generation of a map image. Alternatively, textures are not applied to the polygons though the polygons are placed upon generation of a map image. Alternatively, the map image attribute of "nothing" is assigned to the polygons. Thus, a floor, the root or the like which hides the player object 101 can be prevented from being depicted on a map image in the map image drawing processing in FIG. 15 or 18.

In addition, for example, it is difficult in general to clearly indicate by using a map image, to the player, a shape such as a sheer cliff in the game space, having portions extremely different in their heights. Accordingly, a map image attribute of "boundary line" is assigned to polygons forming a shape such as a sheer cliff, having portions extremely different in their heights, and map image textures representing boundary lines (typically, contour lines) that represent the shape are applied to the polygons to which the map image attribute of "boundary line" is assigned, in the map image drawing processing in FIG. 15 or 18. Thus, a shape such as a sheer cliff, having portions extremely different in their heights can be clearly indicated to the player by using a map image. Alternatively, instead of assigning the map image attribute of "boundary line" to the polygons, the boundary between polygons present at positions extremely different in their heights may be determined, and an object of boundary line may be placed at the boundary.

In addition, for example, in the case where a slope is formed in the game space, map image attributes may be assigned to polygons forming the slope such that the colors of the polygons gradually vary from the highest position to the lowest position, and thereby map image textures different in their colors may be applied to the polygons. Thus, a slope in the game space can be represented in a gradational manner on a map image.

In addition, thus far, the cases where a game image is depicted from a third person viewpoint are described as examples. However, a game image may be depicted from a first person viewpoint.

In addition, in the description thus far, the game image camera and the map image camera are separately provided, and these virtual cameras are used while being switched to each other, thereby generating a game image and a game map. However, one virtual camera may serve as both the game image camera and the map image camera, and may generate a game image and a map image. In this case, one virtual camera moves between the position for the game image camera and the position for the map image camera, thereby generating a game image and a map image.

In addition, in the description thus far, as an example, example embodiments of the present invention are used for generating a display image of a game. However, the present invention is not limited thereto, and may be used for generating display images for various purposes.

In addition, in the description thus far, all the steps of processing described above are executed in the game system 1 shown in FIG. 1, as an example. However, the steps described above may be shared and executed by a plurality of apparatuses (or systems) connected to each other by wire or wirelessly. For example, among the steps described above, processing of steps S5, S8, and S15 in FIG. 12 may be executed by a terminal apparatus, and processing of the other steps in FIG. 12 may be executed by a server apparatus in a system including the terminal apparatus and the server apparatus.

While example embodiments of the invention have been described in detail, the foregoing description is in all aspects illustrative and not restrictive. It will be understood that numerous other modifications and variations can be devised without departing from the scope of the invention.

What is claimed is:

1. A non-transitory computer-readable storage medium having stored therein an image processing program which is executed by a computer of an image processing apparatus which places a plurality of polygons in a 3-dimensional virtual space, the image processing apparatus including a storage for storing plural types of attributes which the plurality of polygons have, plural types of first textures corresponding to the plural types of attributes, and plural types of second textures corresponding to the plural types of attributes, the image processing program causing the computer to provide functionality comprising:
a main image generation for mapping each of the plural types of first textures to the polygon that has the attribute of the type corresponding to the first texture, shooting the 3-dimensional virtual space by a first virtual camera, and thereby generating a main image; and
a map image generation for mapping each of the plural types of second textures to the polygon that has the attribute of the type corresponding to the second texture, shooting the 3-dimensional virtual space by a second virtual camera, and thereby generating a map image.

2. The non-transitory computer-readable storage medium having stored therein the image processing program, according to claim 1, wherein
the plural types of attributes stored in the storage include plural types of first attributes for the main image, and plural types of second attributes for the map image,
each of the plural types of first textures corresponds to one of the plural types of first attributes,
each of the plural types of second textures corresponds to one of the plural types of second attributes,
the main image generation maps each of the plural types of first textures to the polygon that has the first attribute of the type corresponding to the first texture, shoots the 3-dimensional virtual space by the first virtual camera, and thereby generates the main image, and the map image generation maps each of the plural types of second textures to the polygon that has the second attribute of the type corresponding to the second texture, shoots the 3-dimensional virtual space by the second virtual camera, and thereby generates the map image.

3. The non-transitory computer-readable storage medium having stored therein the image processing program, according to claim 2, wherein the image processing program further causes the computer to provide functionality comprising:

a placement determination for determining, for at least the polygon that is to be placed in a shooting area of the second virtual camera, whether or not the second attribute of the polygon is of a type that causes the polygon to be placed; and a polygon placement for placing the plurality of polygons in the 3-dimensional virtual space, and the polygon placement places, in the 3-dimensional virtual space, at least all the polygons that are to be placed in a shooting area of the first virtual camera, when the main image generation generates the main image, and places, in the 3-dimensional virtual space, only a polygon having the second attribute of the type that causes the polygon to be placed, among at least the polygons that are to be placed in the shooting area of the second virtual camera, when the map image generation generates the map image.

4. The non-transitory computer-readable storage medium having stored therein the image processing program, according to claim 2, wherein the image processing program further causes the computer to provide functionality comprising:

a polygon placement for placing the plurality of polygons in the 3-dimensional virtual space; and a mapping determination for determining, for at least the polygon placed in a shooting area of the second virtual camera, whether or not the second attribute of the polygon is of a type that causes one of the plural types of second textures to be mapped to the polygon, and the map image generation maps, only to the polygon that has the second attribute that has been determined by the mapping determination to be of the type that causes one of the plural types of second textures to be mapped to the polygon, the second texture of the type corresponding to the second attribute.

5. The non-transitory computer-readable storage medium having stored therein the image processing program, according to claim 1, wherein the 3-dimensional virtual space to be shot by the main image generation is identical to the 3-dimensional virtual space to be shot by the map image generation.

6. The non-transitory computer-readable storage medium having stored therein the image processing program, according to claim 1, wherein the first virtual camera shoots in any direction, and the second virtual camera shoots in a fixed direction.

7. The non-transitory computer-readable storage medium having stored therein the image processing program, according to claim 1, wherein the second virtual camera shoots by parallel projection.

8. The non-transitory computer-readable storage medium having stored therein the image processing program, according to claim 1, wherein an image size of the second textures is smaller than an image size of the first textures.

9. The non-transitory computer-readable storage medium having stored therein the image processing program, according to claim 1, wherein the map image generation performs mapping to the polygons that have the same type of attribute, in a lump.

10. The non-transitory computer-readable storage medium having stored therein the image processing program, according to claim 1, wherein the map image generation maps, to each of the plurality of polygons, a plurality of the second textures of the type corresponding to the polygon, such that the plurality of the second textures are arranged on the polygon.

11. The non-transitory computer-readable storage medium having stored therein the image processing program, according to claim 1, wherein the map image generation screen-captures, as a raster graphic image, an image shot by the second virtual camera, and thereby generates the map image.

12. The non-transitory computer-readable storage medium having stored therein the image processing program, according to claim 1, wherein the storage stores a first object and a second object that represent the same character, the main image generation shoots the 3-dimensional virtual space in which the first object is placed, and the map image generation shoots the 3-dimensional virtual space in which the second object is placed.

13. The non-transitory computer-readable storage medium having stored therein the image processing program, according to claim 1, wherein the image processing program further causes the computer to provide functionality comprising:

a vertical direction position determination for determining, for at least the polygon that is to be placed in a shooting area of the second virtual camera, whether or not a value indicating the position in the vertical direction of the polygon is larger than a predetermined value; and a polygon placement for placing the plurality of polygons in the 3-dimensional virtual space, and the polygon placement places, in the 3-dimensional virtual space, at least all the polygons that are to be placed in a shooting area of the first virtual camera, when the main image generation generates the main image, and places, in the 3-dimensional virtual space, only a polygon, a value indicating the position in the vertical direction of which has been determined to be not larger than the predetermined value by the vertical direction position determination, among at least the polygons that are to be placed in the shooting area of the second virtual camera, when the map image generation generates the map image.

14. The non-transitory computer-readable storage medium having stored therein the image processing program, according to claim 1, wherein the first virtual camera is identical to the second virtual camera.

15. An image processing apparatus configured to place a plurality of polygons in a 3-dimensional virtual space, the image processing apparatus including a storage for storing plural types of attributes which the plurality of polygons have, plural types of first textures corresponding to the plural types of attributes, and plural types of second textures corresponding to the plural types of attributes, the image processing apparatus comprising:

a computer system, comprising a computer processor, the computer system being configured to at least:

map each of the plural types of first textures to the polygon that has the attribute of the type corresponding to the first texture, shoot the 3-dimensional virtual space by a first virtual camera, and thereby generate a main image; and map each of the plural types of second textures to the polygon that has the attribute of the type corresponding to the second texture, shoot the 3-dimensional virtual space by a second virtual camera, and thereby generate a map image.

16. An image processing system configured to place a plurality of polygons in a 3-dimensional virtual space, the image processing system including a storage for storing plural types of attributes which the plurality of polygons have, plural types of first textures corresponding to the plural types of attributes, and plural types of second textures corresponding to the plural types of attributes, the image processing system comprising:

a main image generator configured to map each of the plural types of first textures to the polygon that has the attribute of the type corresponding to the first texture, shoot the 3-dimensional virtual space by a first virtual camera, and thereby generate a main image; and a map image generator configured to map each of the plural types of second textures to the polygon that has the attribute of the type corresponding to the second texture, shoot the 3-dimensional virtual space by a second virtual camera, and thereby generate a map image.

17. An image processing method for placing a plurality of polygons in a 3-dimensional virtual space and generating a main image and a map image, the image processing method comprising:

mapping, using a computer processor, each of the plural types of first textures corresponding to plural types of attributes which the plurality of polygons have, to the polygon that has the attribute of the type corresponding to the first texture, shooting the 3-dimensional virtual space by a first virtual camera, and thereby generating the main image; and mapping each of the plural types of second textures corresponding to plural types of attributes which the plurality of polygons have, to the polygon that has the attribute of the type corresponding to the second texture, shooting the 3-dimensional virtual space by a second virtual camera, and thereby generating the map image.

18. The system according to claim 16, wherein the plural types of attributes stored in the storage include plural types of first attributes for the main image, and plural types of second attributes for the map image, each of the plural types of first textures corresponds to one of the plural types of first attributes, each of the plural types of second textures corresponds to one of the plural types of second attributes, the main image generator is configured to map each of the plural types of first textures to the polygon that has the first attribute of the type corresponding to the first texture, shoot the 3-dimensional virtual space by the first virtual camera, and to thereby generate the main image, and the map image generator is configured to map each of the plural types of second textures to the polygon that has the second attribute of the type corresponding to the second texture, shoot the 3-dimensional virtual space by the second virtual camera, and to thereby generate the map image.

19. The system according to claim 16, wherein the 3-dimensional virtual space to be shot by the main image generator is identical to the 3-dimensional virtual space to be shot by the map image generator.

20. The system according to claim 16, wherein the first virtual camera is configured to shoot in any direction, and the second virtual camera is configured to shoot in a fixed direction.

21. The system according to claim 16, wherein an image size of the second textures is smaller than an image size of the first textures.

22. The system according to claim 16, wherein the storage is configured to store a first object and a second object that represent the same character, the main image generator is configured to shoot the 3-dimensional virtual space in which the first object is placed, and the map image generator is configured to shoot the 3-dimensional virtual space in which the second object is placed.

23. The system according to claim 16, wherein the first virtual camera is identical to the second virtual camera.

* * * * *